(12) United States Patent
Asao et al.

(10) Patent No.: US 6,515,393 B2
(45) Date of Patent: Feb. 4, 2003

(54) AUTOMOTIVE ALTERNATOR

(75) Inventors: Yoshihito Asao, Tokyo (JP); Atsushi Oohashi, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,396

(22) Filed: Apr. 23, 2001

(65) Prior Publication Data
US 2002/0063490 A1 May 30, 2002

(30) Foreign Application Priority Data
Nov. 24, 2000 (JP) .......................... 2000-357546

(51) Int. Cl.[7] .............................. H02K 3/12; H02K 3/28
(52) U.S. Cl. ...................... 310/184; 310/180; 310/179; 310/201; 310/206; 310/207
(58) Field of Search .................... 310/179, 180, 310/184, 201, 207, 206

(56) References Cited
U.S. PATENT DOCUMENTS

| | | |
|---|---|---|
| 4,307,311 A | 12/1981 | Grozinger |
| 4,857,787 A | 8/1989 | Taji et al. |
| 4,908,541 A | 3/1990 | Kawazoe et al. |
| 4,954,734 A | 9/1990 | Iguchi et al. |
| 5,122,705 A | 6/1992 | Kusase et al. |

FOREIGN PATENT DOCUMENTS

| | | | |
|---|---|---|---|
| JP | 57-132-743 | 8/1982 | |
| JP | 59-159-638 | 9/1984 | |
| JP | 4-26345 | 1/1992 | .......... H02K/19/22 |

Primary Examiner—Burton S. Mullins
(74) Attorney, Agent, or Firm—Sughrue Mion, PLLC

(57) ABSTRACT

Six single phase winding portions are installed in slots disposed at a ratio of two per phase per pole. Each single-phase winding portion has two wave windings formed by winding a conductor wire for a predetermined number of winds into a wave-shaped pattern composed of slot-housed portions disposed at a pitch of six slots in a circumferential direction and crossover portions linking together end portions of adjacent pairs of the slot-housed portions alternately relative to an axial direction, the wave windings being offset by six slots from each other circumferentially and installed in the slots such that the crossover portions face each other axially.

9 Claims, 14 Drawing Sheets

F I G. 19
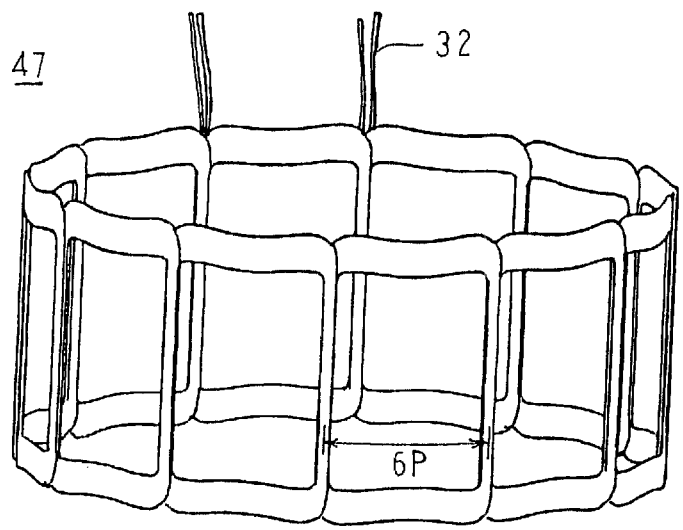

AUTOMOTIVE ALTERNATOR

This application is based on Application No. 2000-357546, filed in Japan on Nov. 24, 2000, the contents of which are hereby incorporated by reference.

BACKGROUND OF THE INVENTION

1. Field of the Invention

The present invention relates to an automotive alternator and particularly to a stator winding construction for an automotive alternator.

2. Description of the Related Art

Generally, an automotive alternator includes: a stator constructed by installing a stator winding into a cylindrical stator core in which slots extending axially are formed at a predetermined pitch in a circumferential direction; and a rotor disposed on an inner circumferential side of the stator and having a field winding. The slots are disposed in the stator core at a ratio of one per phase per pole, in proportion to the number of phases in the stator winding and the number of magnetic poles in the rotor.

When the slots are disposed at a ratio of one per phase per pole in this manner, the amount of time that a tooth formed between the slots overlaps an adjacent pair of the magnetic poles.relative to a radial direction is long, leading to increased magnetic flux leakage. This magnetic flux leakage reduces effective magnetic flux and gives rise to surges in the magnetic flux, resulting in fluctuations in the generated voltage and disturbing the output waveform, which causes ripples when the alternating current is converted into direct current.

Thus, an attempt has been proposed in Japanese Patent Laid-Open No. HEI 4-26345, for example, to reduce magnetic flux leakage by disposing the slots at a ratio of two per phase per pole to shorten the amount of time that a tooth overlaps an adjacent pair of the magnetic poles relative to the radial direction.

FIG. 20 is a schematic diagram in which part of a stator such as that described in Japanese Patent Laid-Open No. HEI 4-26345, for example, is developed into a plan.

In FIG. 20, a stator core 60 is composed by forming a magnetic steel plate into a cylindrical shape, slots 61 extending axially being disposed therein at an even angular pitch in a circumferential direction at a ratio of two per phase per pole. Here, for twelve magnetic poles in a rotor (not shown), seventy-two slots 61 are disposed in the stator core 60 so as to obtain a stator winding 63 composed of first and second three-phase alternating-current windings. The seventy-two slots 61 are constructed by arranging at a pitch of six slots slot group composed of first to sixth slots 61a, 61a', G1b, 61b', 61c, and 61c' disposed at a pitch corresponding to an electrical angle of 30° from each other.

A first single-phase winding portion 63a is constructed by winding a conductor wire into a wave shape in a first slot group composed of the first slots 61a, a third single-phase winding portion 63b is constructed by winding a conductor wire into a wave shape in a third slot group composed of the third slots 61b, and in addition, a fifth single-phase winding portion 63c is constructed by winding a conductor wire into a wave shape in a fifth slot group composed of the fifth slots 61c. The first three-phase alternating-current winding is constructed by forming the first, third, and fifth single-phase winding portions 63a, 63b, and 63c wound in this manner into a Y-connection. Here, the slots into which the first, third, and fifth single-phase winding portions 63a, 63b, and 63c are wound have a phase difference corresponding to an electrical angle of 60° from each other.

A second single-phase winding portion 63a' is constructed by winding a conductor wire into a wave shape in a second slot group composed of the second slots 61a', a fourth single-phase winding portion 63b' is constructed by winding a conductor wire into a wave shape in a fourth slot group composed of the fourth slots 61b', and in addition, a sixth single-phase winding portion 63c' is constructed by winding a conductor wire into a wave shape in a sixth slot group composed of the sixth slots 61c'. The second three-phase alternating-current winding is constructed by forming the second, fourth, and sixth single-phase winding portions 63a', 63b', and 63c' wound in this manner into a Y-connection. Here, the slots into which the second, fourth, and sixth single-phase winding portions 63a', 63b', and 63c' are wound have a phase difference corresponding to an electrical angle of 60° from each other. Furthermore, the second, fourth, and sixth single-phase winding portions 63a', 63b', and 63c' have a phase difference corresponding to an electrical angle of 30° from the first, third, and fifth single-phase winding portions 63a, 63b, and 63c, respectively.

As shown in FIG. 21, a stator 65 is prepared by winding these single-phase winding portions 63a, 63a', 63b, 63b', 63c, and 63c' in the stator core 60. In the stator 65 constructed in this manner, because the slots 61 are disposed at a ratio of two per phase per pole, portions of a tooth 62 overlapping an adjacent pair of the magnetic poles relative to the radial direction is dramatically reduced. Thus, magnetic flux leakage is reduced, enabling reductions in effective magnetic flux to be suppressed. Similarly, the generation of surges in the magnetic flux is suppressed, reducing fluctuations in the generated voltage and disturbances to the output waveform, thereby reducing ripples when the alternating current is converted into direct current.

In the stator 65 of the conventional automotive alternator, as explained above, the single-phase winding portions 63a, 63a', 63b, 63b', 63c, and 63c' constituting the stator winding 63 are each constructed by winding the conductor wire into a wave shape in every sixth slot 61 so as to extend out of a first slot 61 and enter a second slot 61 six slots away.

As shown in FIG. 22, bundles containing a predetermined number of the conductor wires constituting the single-phase winding portions 63a, 63a', 63b, 63b', 63c, and 63c' overlap radially in regions A where the conductor wires are bent circumferentially after extending outwards from the slots 61, expanding radially.

Thus, coil end groups of the stator winding 63 are formed with large irregularities relative to the circumferential direction, and one problem has been that loud wind noise is generated as a result of pressure differences between the coil end groups and the rotor and between the coil end groups and fans. Furthermore, the radially-overlapping bundles of the conductor wires in the regions A where the conductor wires are bent circumferentially after extending outwards from the slots 61 are less likely to be exposed to a cooling airflow, and therefore another problem has been that heat generated in the stator 65 does not efficiently dissipate from the coil end groups, making it difficult to suppress temperature increases in the stator 65, and output cannot be improved.

Thus, in a conventional automotive alternator mounted with the stator 65 in which the two three-phase alternating-current windings are wound into the stator core 60 in which slots are disposed at a ratio of two per phase per pole, there have been problems preventing increased performance from the viewpoints of wind noise and output.

SUMMARY OF THE INVENTION

The present invention aims to solve the above problems and an object of the present invention is to provide an automotive alternator enabling temperature increases in a stator to be suppressed by constructing a single-phase winding portion constituting a stator winding by installing a conductor wire which extends from slots such that winds thereof are divided onto first and second circumferential sides, reducing circumferential irregularities in a coil end group to reduce wind noise, and suppressing radial overlap between bundles of winds of the conductor wire constituting the coil end group to raise heat dissipation from the coil end group.

In order to achieve the above object, according to one aspect of the present invention, there is provided an automotive alternator including:

a rotor rotatably supported in a bracket; and a stator provided with a cylindrical stator core in which a plurality of slots extending axially are formed circumferentially and a stator winding installed in the stator core, the stator being supported in the bracket so as to surround an outer circumference of the rotor, wnerein the slots are formed in the stator core at a ratio of two per phase per pole, wherein the stator winding is provided with two three-phase alternating-current windings, each of the three-phase alternating-current windings being constructed by forming three single-phase winding portions installed in the slots into an alternating-current connection, and wherein each of the single-phase winding portions is constructed by installing a conductor wire such that winds of the conductor wire extend outwards from first and second ends of the slots, are divided onto first and second circumferential sides, and enter slots on the first and second circumferential sides.

At least one of the single-phase winding portions may be provided with a plurality of wave windings formed by winding the conductor wire for a predetermined number of winds into a wave-shaped pattern composed of slot-housed portions disposed at a pitch of six slots in a circumferential direction and crossover portions linking together end portions of adjacent pairs of the slot-housed portions alternately relative to an axial direction, the plurality of wave windings being offset by six slots from each other in a circumferential direction and installed in the slots such that the crossover portions face each other axially.

At least one of the single-phase winding portions may be provided with a divided wave winding, the divided wave winding including:

a first winding sub-portion formed by winding the conductor wire for a predetermined number of winds into a first wave-shaped pattern composed of first slot-housed portions disposed at a pitch of six slots in a circumferential direction and first crossover portions linking together end portions of adjacent pairs of the first slot-housed portions alternately relative to an axial direction; and a second winding sub-portion formed by continuing to wind the conductor wire from a winding finish end of the first winding sub-portion for a predetermined number of winds into a second wave-shaped pattern composed of second slot-housed portions disposed at a pitch of six slots in a circumferential direction and second crossover portions linking together end portions of adjacent pairs of the second slot-housed portions alternately relative to an axial direction, wherein the first winding sub-portion and the second winding sub-portion are stacked such that the first slot-housed portions and the second slot-housed portions face each other, and the first crossover portions and the second crossover portions face each other axially.

A neutral-point lead wire of at least one of the single-phase winding portions may be led out of a first slot and an output wire thereof may be led out of a second slot.

At least one of the three-phase alternating-current windings may be constructed by forming the three single-phase winding portions into a Y-connection, slots out of which neutral-point lead wires of the three single-phase winding portions are led being disposed between a circumferentially-adjacent pair of slots out of which output wires of the single-phase winding portions are led.

At least one of the single-phase winding portions may be constructed by installing the conductor wire in a lap winding in the slots.

At least one of the single-phase winding portions may be provided with a winding sub-portion constructed by simultaneously winding a plurality of strands of the conductor wire.

At least one of the single-phase winding portions may be constructed by connecting in series winding sub-portions constructed by winding the conductor wire.

The number of divided winds of the conductor wire extending outwards from the first and second ends of the slots and divided onto the first and second circumferential sides may be the same in at least one of the single-phase winding portions.

At least one of the single-phase winding portions may be provided with a plurality of winding sub-portions formed by installing at least one strand of the conductor wire in the stator core, the number of divided winds of the conductor wire extending outwards from the first and second ends of the slots and divided onto the first and second circumferential sides being different in each of the plurality of winding sub-portions, and the total number of divided winds of the conductor wire extending outwards from the first and second ends of the slots and divided onto the first and second circumferential sides being the same on the first and second circumferential sides.

Coil end groups of the stator winding may be constituted by a plurality of crossover portions linking together slot-housed portions of the conductor wire housed in pairs of the slots six slots apart outside end surfaces of the stator core, at least some crossover portions of the plurality of crossover portions being axially offset.

Coil end groups of the stator winding may be constituted by a plurality of crossover portions linking together slot-housed portions of the conductor wire housed in pairs of the slots six slots apart outside end surfaces of the stator core, the crossover portions constituting an inner circumferential side of the coil end groups being constructed such that the winds of the conductor wire therein line up axially without overlapping radially.

A fan may be mounted to an axial end surface of the rotor; and coil end groups of the stator winding may be constituted by a plurality of crossover portions linking together slot-housed portions of the conductor wire housed in pairs of the slots six slots apart outside end surfaces of the stator core, wherein the axial end surface of the rotor to which the fan is mounted is positioned axially outside base portions of the crossover portions.

A fan may be mounted to an axial end surface of the rotor; and coil end groups of the stator winding may be constituted by a plurality of crossover portions linking together slot-housed portions of the conductor wire housed in pairs of the slots six slots apart outside end surfaces of the stator core, wherein the fan and the crossover portions overlap relative to an axial direction, and wherein a ventilation gap is formed between base portions of the crossover portions and end surfaces of the stator.

A central portion of an axial height of the fan and an apex portion of the coil end group may be generally aligned relative to the axial direction.

BRIEF DESCRIPTION OF THE DRAWINGS

FIG. 19 is a perspective showing the single-phase winding portion constituting the stator winding of the stator in the automotive alternator according to Embodiment 8 of the present invention;

DETAILED DESCRIPTION OF THE PREFERRED EMBODIMENTS

The preferred embodiments of the present invention will now be explained with reference to the drawings.

Embodiment 1

Figure 1:
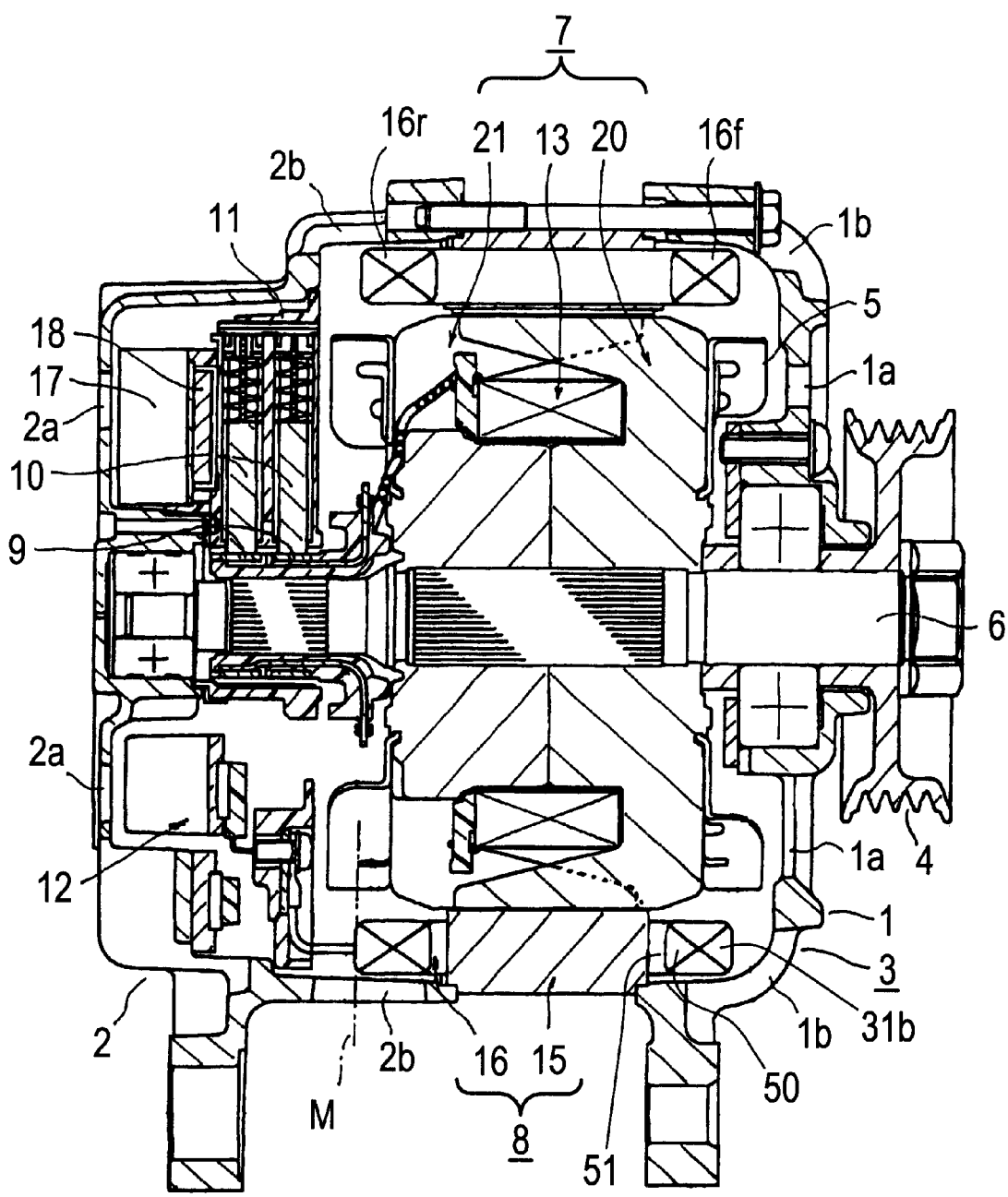
FIG. 1 is a cross section showing an automotive alternator according to Embodiment 1 of the present invention.
Figure 2:
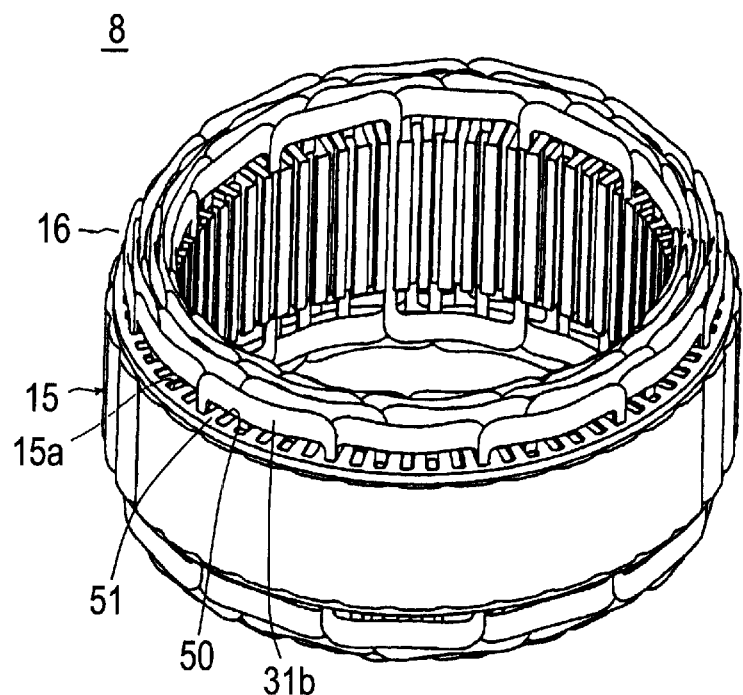
FIG. 2 is a perspective showing a stator used in the automotive alternator according to Embodiment 1 of the present invention.
Figure 3:
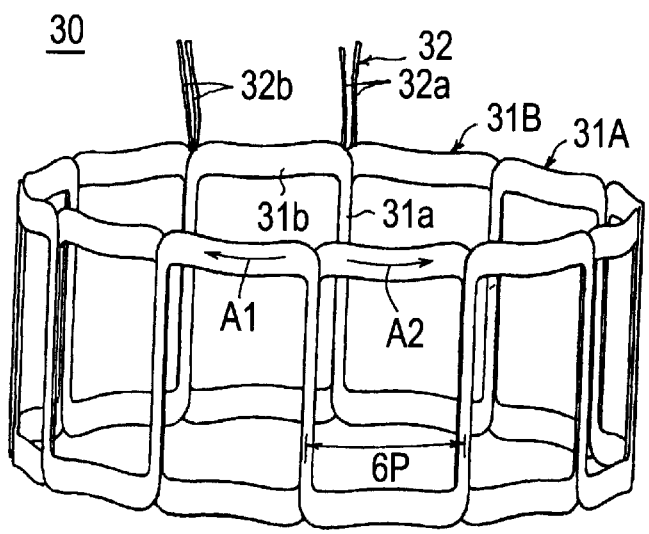
FIG. 3 is a perspective showing a single-phase winding portion constituting a stator winding of the stator in the automotive alternator according to Embodiment 1 of the present invention.
Figure 4:
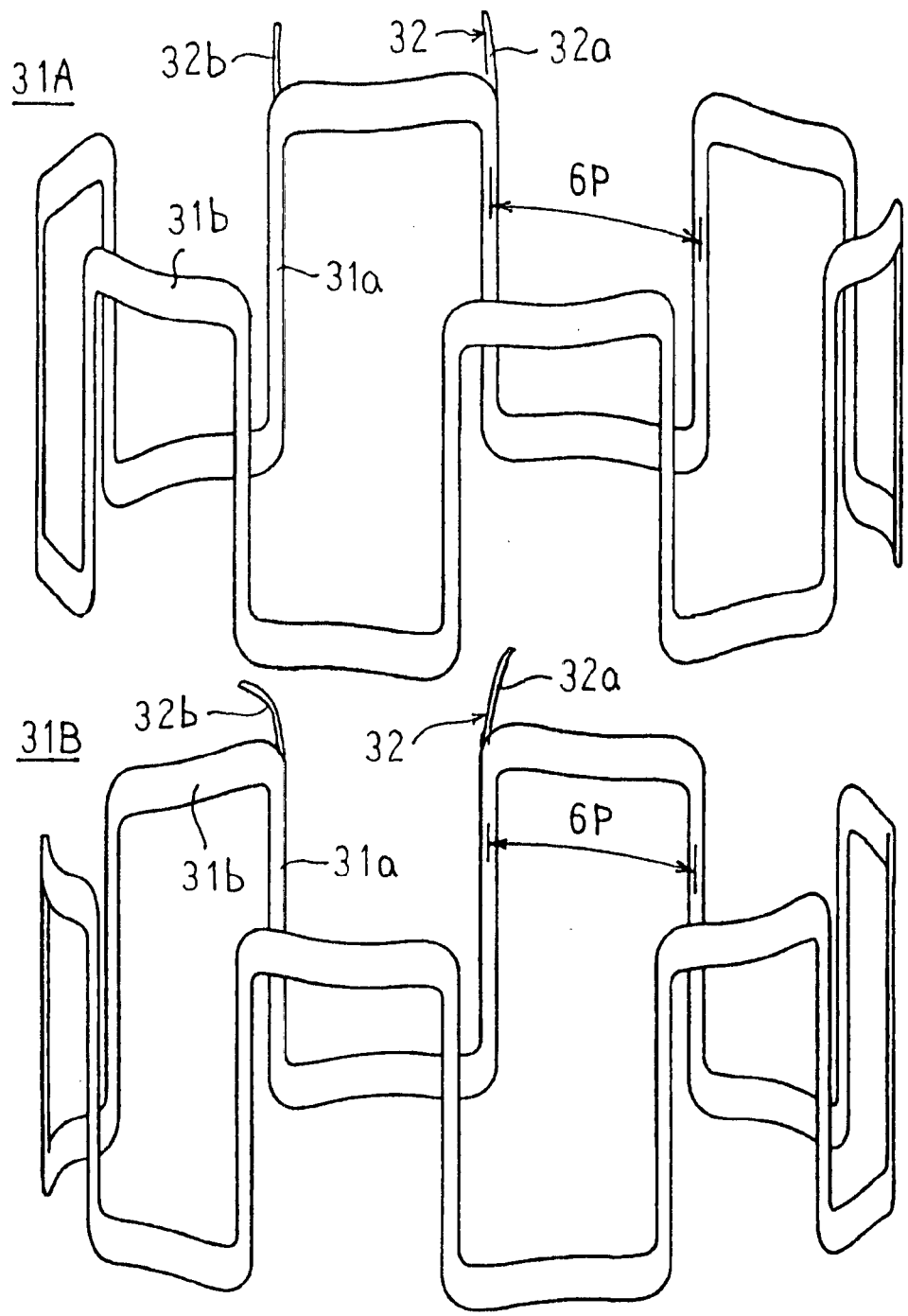
FIG. 4 is an exploded perspective showing the single-phase winding portion constituting the stator winding of the stator in the automotive alternator according to Embodiment 1 of the present invention.
Figure 5:
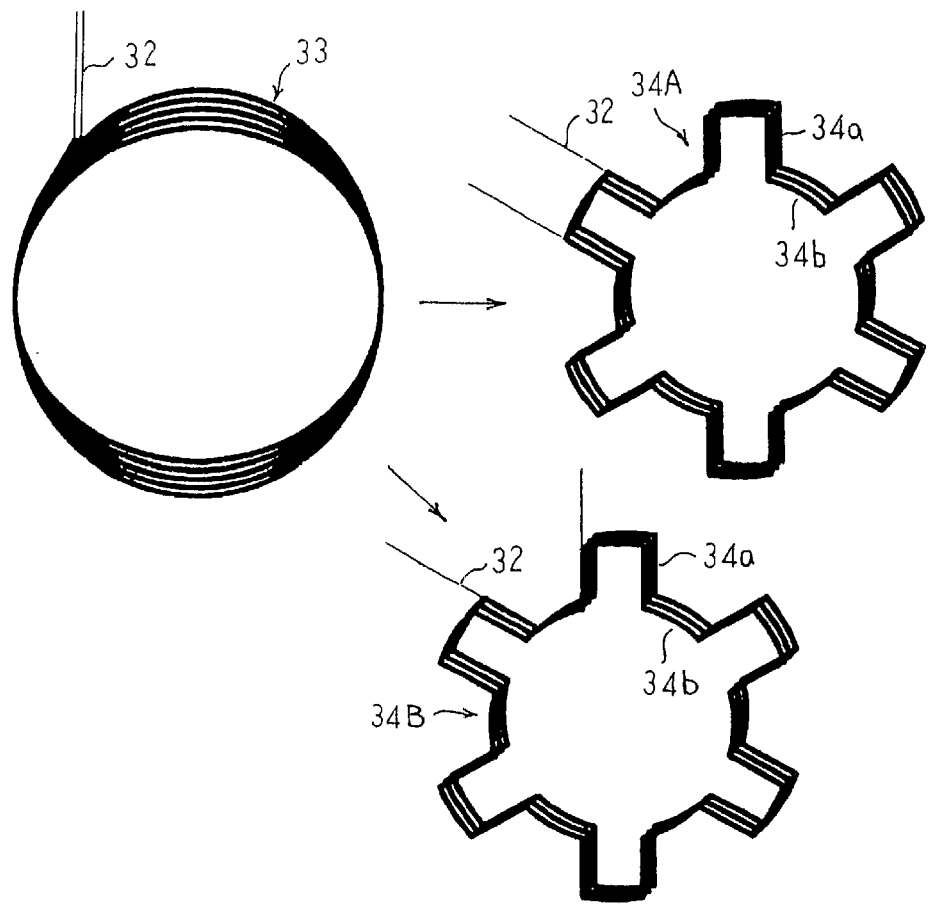
FIG. 5 is a diagram explaining a process for forming the single-phase winding portion constituting the stator winding of the stator in the automotive alternator according to Embodiment 1 of the present invention.
Figure 6:
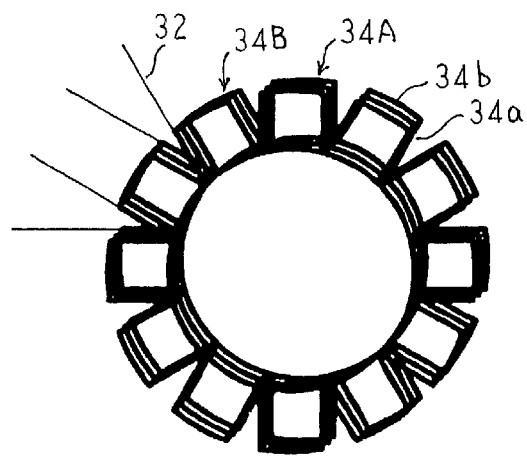
FIG. 6 is another diagram explaining the process for forming the single-phase winding portion constituting the stator winding of the stator in the automotive alternator according to Embodiment 1 of the present invention.
Figure 7:
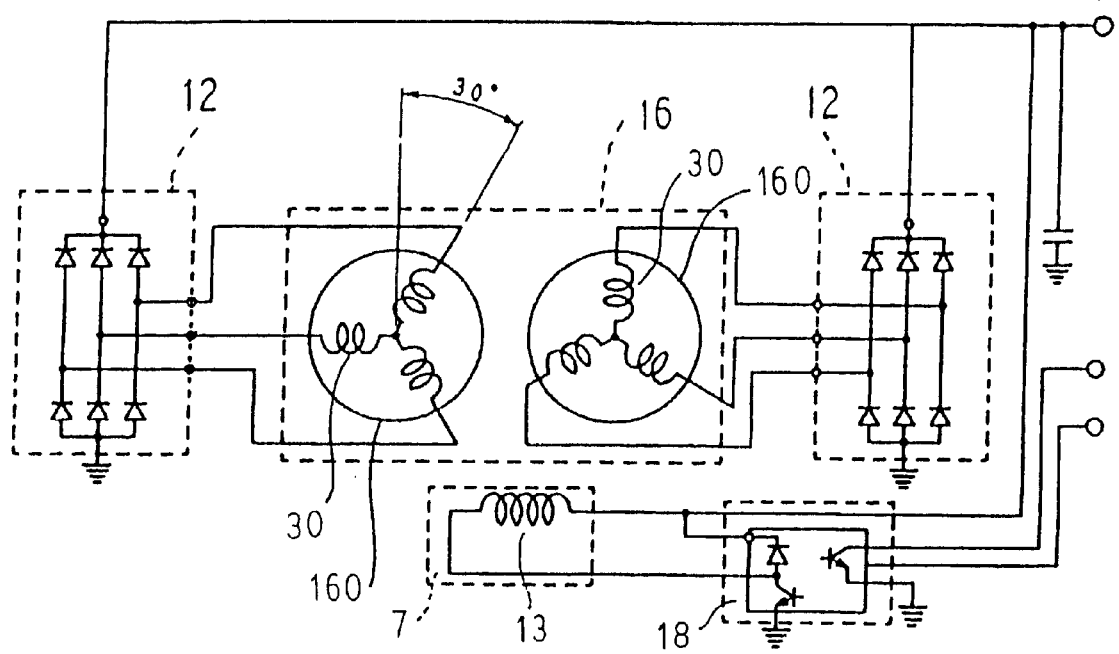
FIG. 7 is a circuit diagram showing an electric power supply circuit in the automotive alternator according to Embodiment 1 of the present invention.

FIG. 1 is a cross section showing an automotive alternator according to Embodiment 1 of the present invention, FIG. 2 is a perspective showing a stator used in the automotive alternator according to Embodiment 1 of the present invention, FIG. 3 is a perspective showing a single-phase winding portion constituting a stator winding of the stator in the automotive alternator according to Embodiment 1 of the present invention, FIG. 4 is an exploded perspective showing the single-phase winding portion constituting the stator winding of the stator in the automotive alternator according to Embodiment 1 of the present invention, FIGS. 5 and 6 are diagrams explaining a process for forming the single-phase winding portion, and FIG. 7 is a circuit diagram showing an electric power supply circuit in the automotive alternator according to Embodiment 1 of the present invention. Moreover, a neutral-point lead wire and an output wire are omitted from FIG. 2.

In FIG. 1, the automotive alternator includes: a case 3 constituted by an aluminum front bracket 1 and an aluminum rear bracket 2; a shaft 6 disposed inside the case 3 having a pulley 4 secured to a first end thereof; a Lundell-type rotor 7 secured to the shaft 6; fans 5 secured to first and second axial end surfaces of the rotor 7; a stator 8 secured to the case 3 so as to envelop the rotor 7; slip rings 9 secured to a second end of the shaft 6 for supplying electric current to the rotor 7; a pair of brushes 10 sliding on surfaces of the slip rings 9; a brush holder 11 accommodating the brushes 10; rectifiers 12 electrically connected to the stator 8 for converting alternating current generated in the stator 8 into direct current; and a regulator 18 fitted onto the brush holder 11 for adjusting the magnitude of the alternating voltage generated in the stator 8.

The rotor 7 is constituted by a field winding 13 for generating magnetic flux on passage of an electric current, and a pair of first and second pole cores 20 and 21 disposed so as to cover the field winding 13, magnetic poles being formed in the first and second pole cores 20 and 21 by magnetic flux generated in the field winding 13. The pair of first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core formed by laminating a magnetic steel plate; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

Next, a construction of the stator 8 will be explained with reference to FIGS. 2 to 6.

Slots 15a extending axially are disposed in the stator core 15 at an even angular pitch in a circumferential direction at a ratio of two per phase per pole. In other words, for twelve claw-shaped magnetic poles 22 and 23 in the rotor 7, seventy-two slots 15a from a Slot Number 1 to a Slot Number 72 are disposed in the stator core 15 so as to obtain the stator winding 16, which is composed of first and second three-phase alternating-current windings. Here, a copper wire material having a circular cross section coated with an electrically-insulating layer is used in a conductor wire 32.

A single-phase winding portion 30 is constituted by type-A and type-B wave windings 31A and 31B. As shown in FIG. 4, these type-A and type-B wave windings 31A and 31B are constructed by winding the conductor wire 32 for a predetermined number of winds into a wave-shaped pattern composed of twelve wave-winding slot-housed portions 31a disposed at a pitch of six slots (6P) in a circumferential direction and wave-winding crossover portions 31b linking together end portions of adjacent pairs of the wave-winding slot-housed portions 31a alternately relative to an axial direction. The single-phase winding portion 30 is constructed by offsetting the type-A and type-B wave windings 31A and 31B by six slots in a circumferential direction and stacking them. As shown in FIG. 3, in this single-phase winding portion 30, the wave-winding slot-housed portions 31a of the type-A and type-B wave windings 31A and 31B are stacked on top of each other in a radial direction, and the wave-winding crossover portions 31b are disposed so as to face each other axially. Then, the single-phase winding portion 30 is installed in the stator core 15 such that two wave-winding slot-housed portions 31a are housed in every sixth slot 15a, that is, in each slot 15a in a first slot group constituted by Slot Numbers 1, 7, 13, . . . , and 67.

Here, winding start ends 32a of the type-A and type-B wave windings 31A and 31B extend outwards from a first slot 15a, and winding finish ends 32b extend outwards from a second slot 15a six slots away. The single-phase winding portion 30, in which the type-A and type-B wave windings 31A and 31B are connected in parallel, is prepared by joining together the winding start ends 32a and joining together the winding finish ends 32b. Here, the joined winding start ends 32a constitute a neutralpoint lead wire of the single-phase winding portion 30, and the joined winding finish ends 32b constitute an output wire of the single-phase winding portion 30.

To install this single-phase winding portion 30 in the stator core 15, first, as shown in FIG. 5, an annular winding unit 33 is prepared by winding one strand of the conductor wire 32 for a predetermined number of winds, and type-A and type-B star winding units 34A and 34B are each prepared by forming the winding unit 33 into a star shape in which end portions of adjacent pairs of the star-winding slot-housed portions 34a are alternately linked on an inner circumferential side and an outer circumferential side by star-winding crossover portions 34b. Next, as shown in FIG. 6, the type-A and type-B star winding units 34A and 34B are offset and stacked on top of each other such that the star-winding slot-housed portions 34a overlap and the star-winding crossover portions 34b face each other radially. Then, the inner circumferential side of the stacked type-A and type-B star winding units 34A and 34B is pushed inside the stator core 15 from a first end surface of the stator core 15. Next, the star-winding crossover portions 34b on the inner circumferential side of the type-A and type-B star winding units 34A and 34B are extended outwards at a second end surface of the stator core 15, and the star-winding slot-housed portions 34a are pushed into each of the slots 15a, installing the single-phase winding portion 30 in the stator core 15.

A single-phase winding portion 30 is similarly installed in each of: a second slot group constituted by Slot Numbers 2, 8, 14, . . . , and 68; a third slot group constituted by Slot Numbers 3, 9, 15, . . . , and 69; a fourth slot group constituted by Slot Numbers 4, 10, 16, . . . , and 70; a fifth slot group constituted by Slot Numbers 5, 11, 17, . . . , and 71; and a sixth slot group constituted by Slot Numbers 6, 12, 18, . . . , and 72.

Thus, the stator 8 is obtained, which is composed of the six single-phase winding portions 30 installed in the stator core 15 as shown in FIG. 2. The wave-winding crossover portions 31b of the six single-phase winding portions 30 are disposed outside the first and second end surfaces of the stator core 15, constituting front-end and rear-end coil end groups 16f and 16r of the stator winding 16. Base portions of the wave-winding crossover portions 31b constituting the coil end groups 16f and 16r are separated by a predetermined distance from the end surfaces of the stator core 15 and disposed generally parallel to the end surfaces of the stator core 15, forming ventilation gaps between the base portions of the wave-winding crossover portions 31b and the end surfaces of the stator core 15. In addition, as shown in FIG. 2, axial heights of the wave-winding crossover portions 31b positioned on an inner circumferential side and an outer circumferential side of the coil end groups 16f and 16r are low, the axial height of the wave-winding crossover portions 31b increasing towards a radially-intermediate portion of the coil end groups 16f and 16r.

As shown in FIG. 1, the first and second axial end surfaces (the fan mounting surfaces) of the rotor 7 are positioned axially further outwards than the base portions of the wave-winding crossover portions 31b of the coil end groups 16f and 16r in the stator 8 constructed in this manner. The fans 5 overlap the wave-winding crossover portions 31b of the coil end groups 16f and 16r relative to an axial direction, and ventilation gaps 51 are formed between base portions 50 of the wave-winding crossover portions 31b and the end surfaces of the stator core 15. In addition, central portions M of axial heights of the fans 5 are generally aligned with apex portions of the coil end groups 16f and 16r relative to the axial direction.

Next, a first three-phase alternating-current winding 160 is constructed by connecting neutral points (Y-connection) of the three single-phase winding portions 30 installed in the first, third, and fifth slot groups, and a second three-phase alternating-current winding 160 is constructed by connecting neutral points (Y-connection) of the three single-phase winding portions 30 installed in the second, fourth, and sixth slot groups. Then, the winding finish ends 32b (output wires) of the single-phase winding portions 30 constituting each of the three-phase alternating-current windings 160 are connected to the rectifiers 12, constructing the electrical circuit shown in FIG. 7.

Moreover, the three single-phase winding portions 30 installed in the first, third, and fifth slot groups are each given a phase difference corresponding to an electrical angle of 60°, and the three single-phase winding portions 30 installed in the second, fourth, and sixth slot groups are each given a phase difference corresponding to an electrical angle of 60°. In addition, the three single-phase winding portions 30 installed in the second, fourth, and sixth slot groups are given a phase difference corresponding to an electrical angle of 30° relative to the three single-phase winding portions 30 installed in the first, third, and fifth slot groups, respectively.

In an automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by the engine and the rotor 7 is rotated by the shaft 6. A rotating magnetic field is applied to the stator core 15 due to the rotation of the rotor 7, generating an electromotive force in the three-phase alternating-current windings 160 of the stator winding 16. The alternating electromotive force generated in each of the three-phase alternating-current windings 160 is converted into direct current by each of the rectifiers 12 and the magnitude of the output voltage thereof is adjusted by the regulator 18. Then, the output from each of the rectifiers is combined, recharging the battery.

Here, front-end and rear-end air intake apertures 1a and 2a are disposed through axial end surfaces of the front bracket 1 and the rear bracket 2, and front-end and rear-end air discharge apertures 1b and 2b are disposed through radial side surfaces of the front bracket 1 and the rear bracket 2 so as to face the coil end groups 16f and 16r of the stator winding 16. Thus, the fans 5 are rotated and driven together with the rotation of the rotor 7, and a cooling airflow channel is formed in which external air is sucked inside the case 3 through the front-end and rear-end air intake apertures 1a and 2a, flows axially towards the rotor 7, is then deflected centrifugally by the fans 5, thereafter crosses the coil end groups 16f and 16r, and is discharged outside through the front-end and rear-end air discharge apertures 1b and 2b. As a result, heat generated in the stator 8 is dissipated from the coil end groups 16f and 16r to the cooling airflow, suppressing temperature increases in the stator 8.

Figure 8:
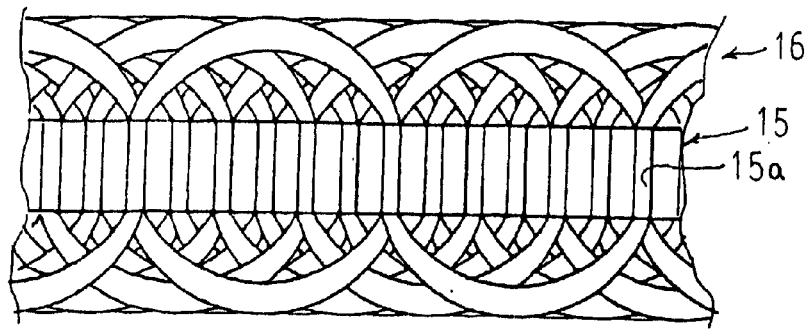
FIG. 8 is a schematic diagram in which a part of the stator in the automotive alternator according to Embodiment 1 of the present invention is developed into a plan.

According to Embodiment 1, the single-phase winding portions 30 are each constructed by installing the conductor wire 32 so as to extend outwards from first and second ends of the slots 15a, be divided in first and second circumferential directions A1 and A2, and enter each of the slots 15a six slots away on the first and second circumferential directions A1 and A2. Thus, because a predetermined number of winds of the conductor wire 32 extending outwards from the slots 15a are divided onto the first and second circumferential sides as shown in FIG. 8, radial overlap between the bundles of winds of the conductor wire constituting the single-phase winding portions 30 in the regions where the winds of the conductor wire are bent circumferentially after extending outwards from the first and second ends of the slots 15a is distributed circumferentially, reducing radial expansion.

Thus, because irregularities in the circumferential direction of the coil end groups 16f and 16r are reduced, wind noise resulting from pressure fluctuations between the coil end groups 16f and 16r and the rotor 7, and between the coil end groups 16f and 16r and the fans 5 can be reduced. Because the radial overlap between the bundles of winds of the conductor wire constituting the single-phase winding portions 30 is reduced, the conductor wire 32 is more easily exposed to the cooling airflow formed by the fans 5, and heat generated in the stator 8 is effectively dissipated from the coil end groups 16f and 16r, suppressing temperature increases in the stator 8.

Because the single-phase winding portions 30 are constructed by connecting type-A and type-B wave windings 31A and 31B in parallel, the thickness of the conductor wire is approximately 0.7 times that of cases where a single-phase winding portion 30 achieving similar output voltage is composed of one wave winding. In other words, because output voltage is proportionate to the number of turns in the single-phase winding portion, in order to achieve the same output voltage, the number of turns required in the single-phase winding portion constructed by connecting the type-A and type-B wave windings 31A and 31B in parallel is the same as the number of turns required in the single-phase winding portion composed of one wave winding. Consequently, the number of turns in each wave winding is the same. Furthermore, because it is necessary to reduce resistance in the conductor wire in order to suppress the amount of generated heat, the total cross-sectional area is designed to approach the cross-sectional area of the slots. Thus, the thickness of the conductor wire in these single-phase winding portions 30 is approximately 0.7 times that of cases where a single-phase winding portion 30 achieving similar output voltage is composed of one wave winding for a similar amount of generated heat. Thus, when the single-phase winding portions 30 are installed in the stator core 15, the conductor wire 32 is less likely to rub against edge portions of openings of the slots and damage electrically-insulating layers, thereby improving electrical insulation.

Because the winding start ends 32a (neutral-point lead wires) of the type-A and type-B wave windings 31A and 31B constituting each of the single-phase winding portions 30 extend out from a common slot and the winding finish ends 32b (output wires) extend out from a common slot, the winding start ends 32a and the winding finish ends 32b can be connected without being led around, facilitating the connection operation.

Because the number of winds of the conductor wire 32 is the same in the type-A and type-B wave windings 31A and 31B constituting each of the single-phase winding portions 30, the number of winds of the conductor wire led out from the first and second ends of the slots 15a and divided onto the first and second circumferential directions A1 and A2 is the same, forming the coil end groups 16f and 16r in a well-balanced manner.

Because the wave-winding crossover portions 31b constituting the coil end groups 16f and 16r are axially offset, radial overlap between the wave-winding crossover portions 31b is reduced, enabling radial dimensions of the coil end groups 16f and 16r to be reduced. Thus, distances between the brackets 1 and 2 and the coil end groups 16f and 16r are increased, ensuring electrical insulation. In particular, because axial heights of the wave-winding crossover portions 31b on the outer circumferential side are lower, electrical insulation distance between the brackets 1 and 2 and the coil end groups 16f and 16r is ensured.

Because the first and second axial end surfaces (the fan mounting surfaces) of the rotor 7 are positioned axially further outwards than the base portions of the wave-winding crossover portions 31b of the coil end groups 16f and 16r, coil end root portions, which are major sources of wind noise, do not overlap with the fans 5, and harmonic components in the wind noise having the same degrees as the number of slots are suppressed, reducing wind noise.

Because the fans 5 overlap the wave-winding crossover portions 31b of the coil end groups 16f and 16r relative to an axial direction, and the ventilation gaps 51 are formed between the base portions 50 of the wave-winding crossover portions 31b and the end surfaces of the stator core 15, the cooling airflow flows through the ventilation gaps between the wave-winding crossover portions 31b and the end surfaces of the stator core 15, efficiently cooling the coil end groups 16f and 16r and suppressing temperature increases in the stator 8.

In addition, because the central portions M of the axial heights of the fans 5 are generally aligned with the apex portions of the coil end groups 16f and 16r relative to the axial direction, the fan central portions, where wind speed is greatest, and the apex portions, which have the largest ventilated surface area on the coil end groups 16f and 16r, overlap, efficiently cooling the coil end groups 16f and 16r and further suppressing temperature increases in the stator 8.

Embodiment 2

In Embodiment 1 above, the single-phase winding portions 30 are each constructed by connecting type-A and type-B wave windings 31A and 31B in parallel, the type-A and type-B wave windings 31A and 31B being composed of type-A and type-B star winding units 34A and 34B each formed by winding one strand of conductor wire 32 for a predetermined number of winds, but in Embodiment 2, the single-phase winding portions 30A are each constructed by connecting first and second type-A wave windings 31A in parallel, the first and second type-A wave windings 31A being composed of type-A star winding units 34A each formed by winding one strand of conductor wire 32 for a predetermined number of winds.

Figure 9:
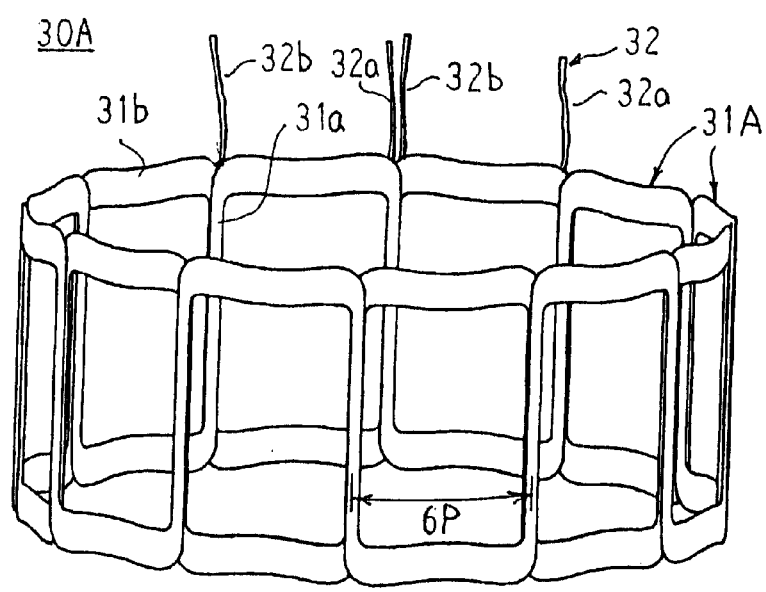
FIG. 9 is a perspective showing a single-phase winding portion constituting a stator winding of a stator in an automotive alternator according to Embodiment 2 of the present invention.

In other words, in Embodiment 2, as shown in FIG. 9, the first and second type-A wave windings 31A are disposed such that the wave-winding slot-housed portions 31a of the first and second type-A wave windings 31A are stacked on top of each other in a radial direction and the wave-winding crossover portions 31b face each other axially. The winding start end 32a of the first type-A wave winding 31A and the winding finish end 32b of the second type-A wave winding 31A extend outwards from a slot 15a positioned in the center of three slots 15a lined up at a pitch of six slots. The winding finish end 32b of the first type-A wave winding 31A and the winding start end 32a of the second type-A wave winding 31A each extend outwards from slots 15a positioned at first and second ends of the three slots 15a lined up at a pitch of six slots. The single-phase winding portion 30A, in which the first and second type-A wave windings 31A are connected in parallel, is prepared by joining the winding start end 32a and the winding finish end 32b which extend outwards from the slot 15a positioned in the center, and joining the winding start end 32a and the winding finish end 32b which extend outwards from each of the slots positioned at the first and second ends. Here, the joint portion between the winding start end 32a and the winding finish end 32b which extend outwards from the slot 15a positioned in the center and the joint portion between the winding start end 32a and the winding finish end 32b which extend outwards from each of the slots positioned at the first and second ends constitute a neutral-point lead wire and an output wire, respectively, of the single-phase winding portion 30A. Moreover, the rest of the construction is constructed in a similar manner to Embodiment 1 above.

Figure 10:
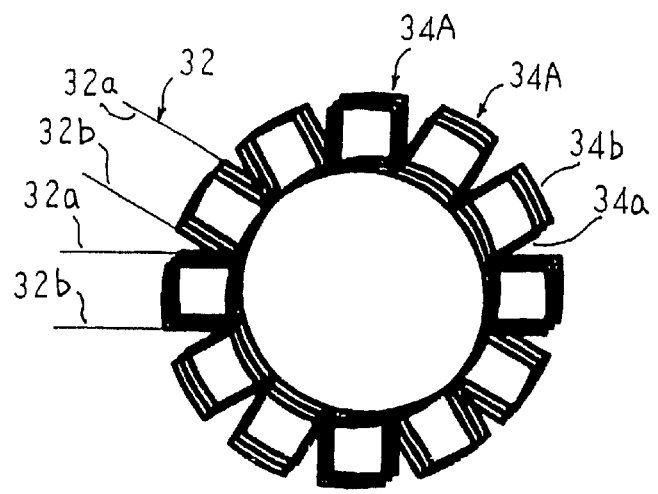
FIG. 10 is a diagram explaining a process for forming the single-phase winding portion constituting the stator winding of the stator in the automotive alternator according to Embodiment 2 of the present invention.

As shown in FIG. 10, the single-phase winding portion 30A is prepared by offsetting and stacking first and second type-A star winding units 34A on top of each other such that the star-winding slot-housed portions 34a overlap and the star-winding crossover portions 34b face each other radially, and installing the type-A star winding units 34A in the stator core 15. The single-phase winding portion 30A, in which the first and second type-A star winding units 34A are connected in parallel, is constructed by connecting the winding finish end 32b of the first type-A star winding unit 34A and the winding start end 32a of the second type-A star winding unit 34A extending outwards from the slot 15a positioned in the center of the three slots 15a lined up at a pitch of six slots, and connecting the winding start end 32a and the winding finish end 32b of the first and second type-A star winding units 34A extending outwards from each of the slots positioned at the first and second ends of the three slots 15a lined up at a pitch of six slots.

Similar effects to those in Embodiment 1 above can also be achieved in Embodiment 2. Furthermore, because it is not necessary to prepare two types of star winding unit, the manufacturing process is simplified, and divided winding portions can be constructed without increasing the number of types of winding unit.

Moreover, in Embodiment 2 above, type-A star winding units 34A are used, but type-B star winding units 34B may be used in place of type-A star winding units 34A.

Embodiment 3

In Embodiment 2 above, the single-phase winding portion 30A is constructed by connecting the first and second type-A wave windings 31A (type-A star winding units 34A) in parallel, but in Embodiment 3, a single-phase winding portion is constructed by connecting the first and second type-A wave windings 31A (type-A star winding units 34A) in series.

In Embodiment 3, the first and second type-A wave windings 31A are disposed in a similar manner to Embodiment 2 above. In other words, as shown in FIG. 9, the first and second type-A wave windings 31A are disposed such that the wave-winding slot-housed portions 31a of the first and second type-A wave windings 31A are stacked on top of each other in a radial direction and the wave-winding crossover portions 31b face each other axially. The single-phase winding portion, in which the first and second type-A wave windings 31A are connected in series, is prepared by connecting the winding start end 32a and the winding finish end 32b of the first and second type-A wave windings 31A extending outwards from the slot 15a positioned in the center of the three slots 15a lined up at a pitch of six slots. The winding start end 32a and the winding finish end 32b of the first and second type-A wave windings 31A extending outwards from each of the slots positioned at the first and second ends of the three slots 15a lined up at a pitch of six slots constitute a neutral-point lead wire and an output wire, respectively, of the single-phase winding portion.

Moreover, the rest of the construction is constructed in a similar manner to Embodiment 2 above.

According to Embodiment 3, because the single-phase winding portion is constituted by connecting in series the first and second type-A star winding units 34A, the number of winds of the conductor wire in the star winding units is halved compared to cases in which a single-phase winding portion having the same number of turns is constituted by one star winding unit, facilitating preparation of the star winding units and improving mountability into the slots.

Embodiment 4

In Embodiment 3 above, the single-phase winding portion is constructed by connecting in series the first and second type-A wave windings 31A, which are each composed of one strand of conductor wire wound for a predetermined number of winds, but in Embodiment 4, a single-phase winding portion 30B having the same number of turns as the above single-phase winding portion is constituted by one divided wave winding 35 composed of one strand of conductor wire wound for a predetermined number of winds.

Figure 11:
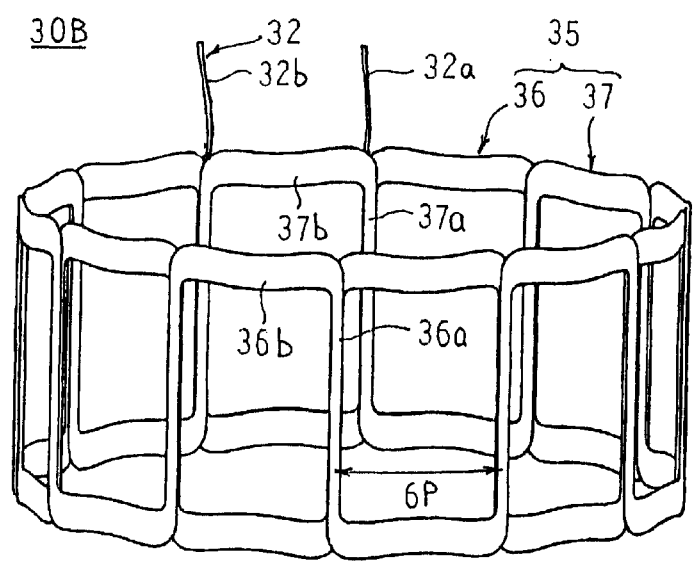
FIG. 11 is a perspective showing a single-phase winding portion constituting a stator winding of a stator in an automotive alternator according to Embodiment 4 of the present invention.

In other words, in Embodiment 4, as shown in FIG. 11, the single-phase winding portion 30B is prepared using the divided wave winding 35, which is composed of a first winding sub-portion 36 formed by winding the conductor wire 32 for a predetermined number of winds into a first wave-shaped pattern composed of first wave-winding slot-housed portions 36a disposed at a pitch of six slots in a circumferential direction and first wave-winding crossover portions 36b linking together end portions of adjacent pairs of the first wave-winding slot-housed portions 36a alternately relative to an axial direction, and a second winding sub-portion 37 formed by continuing to wind the conductor wire 32 from a winding finish end of the first winding sub-portion 36 for a predetermined number of winds into a second wave-shaped pattern composed of second wave-winding slot-housed portions 37a disposed at a pitch of six slots in a circumferential direction and second wave-winding crossover portions 37b linking together end portions of adjacent pairs of the second wave-winding slot-housed portions 37a alternately relative to an axial direction, the first winding sub-portion 36 and the second winding sub-portion 37 being stacked such that the first wave-winding slot-housed portions 36a and the second wave-winding slot-housed portions 37a face each other radially, and the first wave-winding crossover portions 36b and the second wave-winding crossover portions 37b face each other axially. Here, the winding start end 32a of the divided wave winding 35 constitutes a neutral-point lead wire of the single-phase winding portion 30B, and the winding finish end 32b constitutes an output wire of the single-phase winding portion 30B. Moreover, the rest of the construction is constructed in a similar manner to Embodiment 3 above.

Next, a method for preparing the single-phase winding portion 30B will be explained with reference to FIGS. 12A to 12C.

Figure 12A:
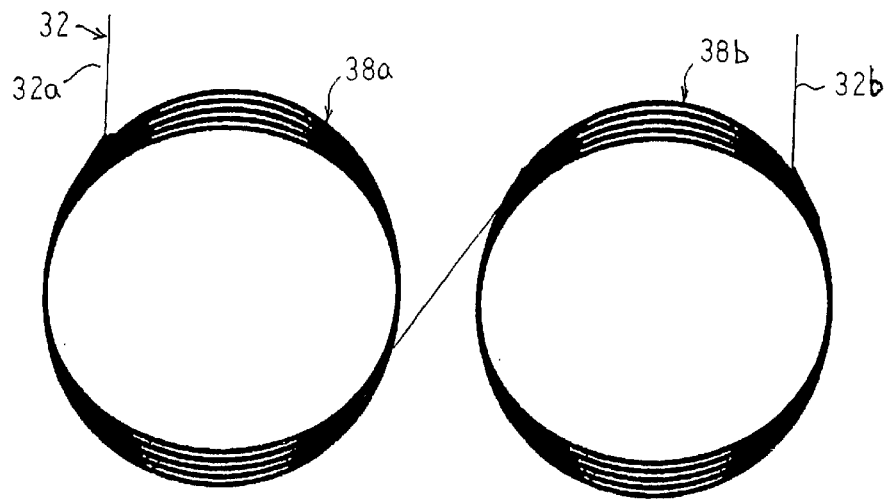
FIG. 12A is a diagram explaining a process for forming the single-phase winding portion constituting the stator winding of the stator in the automotive alternator according to Embodiment 4 of the present invention.
Figure 12B:
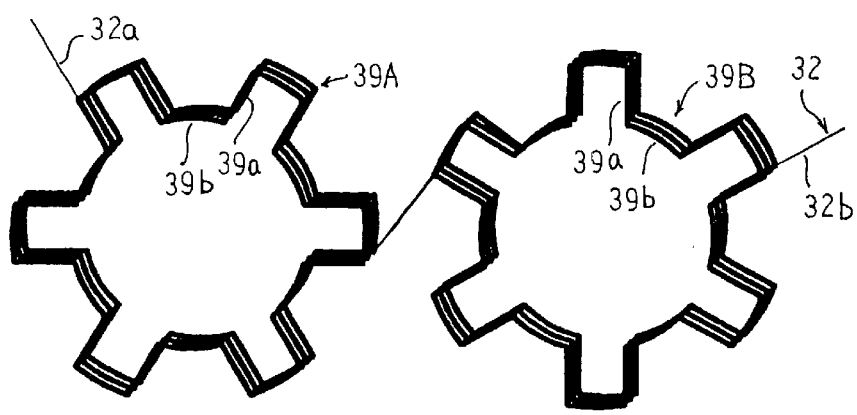
FIG. 12B is another diagram explaining the process for forming the single-phase winding portion constituting the stator winding of the stator in the automotive alternator according to Embodiment 4 of the present invention.
Figure 12C:
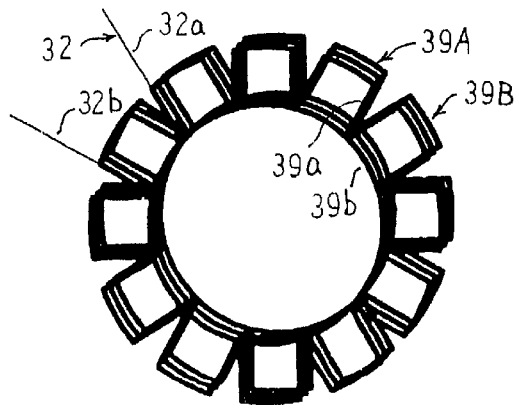
FIG. 12C is yet another diagram explaining the process for forming the single-phase winding portion constituting the stator winding of the stator in the automotive alternator according to Embodiment 4 of the present invention.

First, as shown in FIG. 12A, a first annular winding unit 38a is prepared by winding one strand of the conductor wire 32 for a predetermined number of winds, and a second annular winding unit 38b is prepared by continuing to wind the strand of the conductor wire 32 for a predetermined number of winds. Next, as shown in FIG. 12B, type-A and type-B star winding units 39A and 39B composed of one strand of the conductor wire 32 are prepared by forming the first and second annular winding units 38a and 38b into star shapes in which adjacent pairs of the star-winding slot-housed portions 39a are alternately linked on an inner circumferential side and an outer circumferential side by star-winding crossover portions 39b. Next, as shown in FIG. 12C, the type-A and type-B star winding units 39A and 39B are folded over at a portion of the conductor wire 32 linking the type-A and type-B star winding units 39A and 39B and are stacked on top of each other such that the star-winding slot-housed portions 39a overlap and the star-winding crossover portions 39b face each other radially. The inner circumferential side of the stacked type-A and type-B star winding units 39A and 39B is pushed inside the stator core 15 from a first end surface of the stator core 15, the star-winding crossover portions 39b on the inner circumferential side of the type-A and type-B star winding units 39A and 39B are extended outwards at a second end surface of the stator core 15, and the star-winding slot-housed portions 39a are pushed into each of the slots 15a, installing the single-phase winding portion 30B in the stator core 15.

Similar effects to those in Embodiment 3 above can also be achieved in Embodiment 4, and because the single-phase winding portion 30B, which has the same number of turns as the single-phase winding portion according to Embodiment 3, is constituted by one divided wave winding 35 formed by winding one strand of the conductor wire 32, the total number of neutral-point lead wires and output wires from the single-phase winding portion 30B is two, improving connection workability compared to Embodiment 3 above.

A case in which a single-phase winding portion is constituted by two divided wave windings 35 will now be explained.

If the number of turns (the number of winds of the conductor wire) in the first winding sub-portion 36 and the second winding sub-portion 37 of the divided wave windings 35 is the same, the total number of divided winds of the conductor wire 32 led out from each of the slots 15a and divided onto the first and second circumferential sides is the same at the first and second ends of the slots 15a irrespective of how the two divided wave windings 35 are wound, and the coil end groups 16f and 16r are formed in a well-balanced manner.

On the other hand, if the number of turns in the first winding sub-portion 36 and the second winding sub-portion 37 of the divided wave windings 35 is different, the total number of divided winds of the conductor wire 32 led out from each of the slots 15a and divided onto the first and second circumferential sides is different at the first and second ends of the slots 15a depending on how the two divided wave windings 35 are wound, and the coil end groups 16f and 16r may be formed in an unbalanced manner. Thus, it is desirable that the two divided wave windings 35 be installed such that the total number of divided winds of the conductor wire 32 led out from each of the slots 15a and divided onto the first and second circumferential sides is the same at the first and second ends of the slots 15a. For example, if the first winding sub-portion 36 and the second winding sub-portion 37 are formed with three winds and four winds, respectively, then the two divided wave windings 35 should be wound such that the first wave-winding crossover portions 36b having three winds radially face the second wave-winding crossover portions 37b having four winds. Thus, in the single-phase winding portion, the total number of divided winds of the conductor wire 32 led out from each of the slots 15a and divided onto the first and second circumferential sides is seven at the first and second ends of the slots 15a, and the coil end groups 16f and 16r are formed in a well-balanced manner. In other words, the coil end groups 16f and 16r can be formed in a well-balanced manner even if the single-phase winding portion is constructed with an odd number of turns.

Moreover, here divided wave windings 35 have been explained as an example, but in cases in which windings according to other embodiments are combined and installed in a stator core, it is also desirable that installation be made such that the total number of divided winds of the conductor wire 32 led out from each of the slots 15a and divided onto the first and second circumferential sides is the same at the first and second ends of the slots 15a.

Embodiment 5

In Embodiment 4, the single-phase winding portion 30B is constituted by one divided wave winding 35 formed by winding one strand of the conductor wire 32 for a predetermined number of winds, but in Embodiment 5, a single-phase winding portion is constituted by one divided wave winding 41 formed by simultaneously winding two strands of the conductor wire 32 for a predetermined number of winds. Moreover, the rest of the construction is constructed in a similar manner to Embodiment 4 above.

Next, a method for preparing the single-phase winding portion according to Embodiment 5 will be explained with reference to FIGS. 13A to 13C.

Figure 13A:
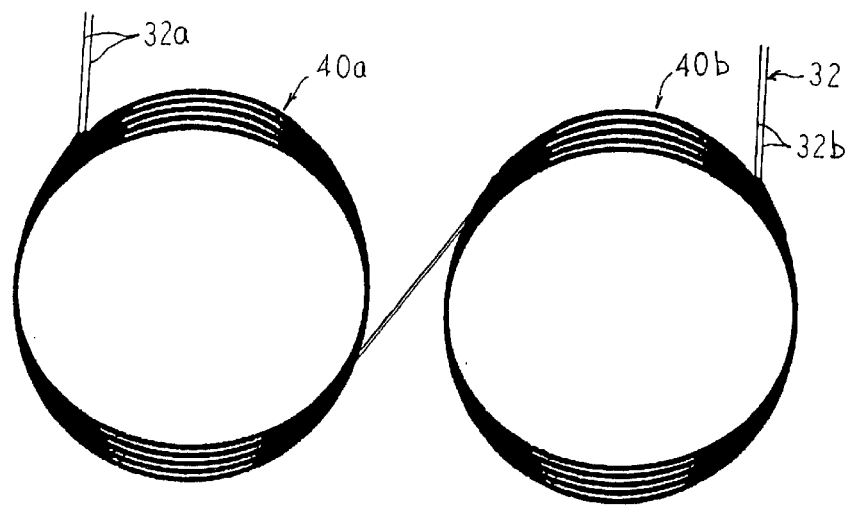
FIG. 13A is a diagram explaining a process for forming a single-phase winding portion constituting a stator winding of a stator in an automotive alternator according to Embodiment 5 of the present invention.
Figure 13B:
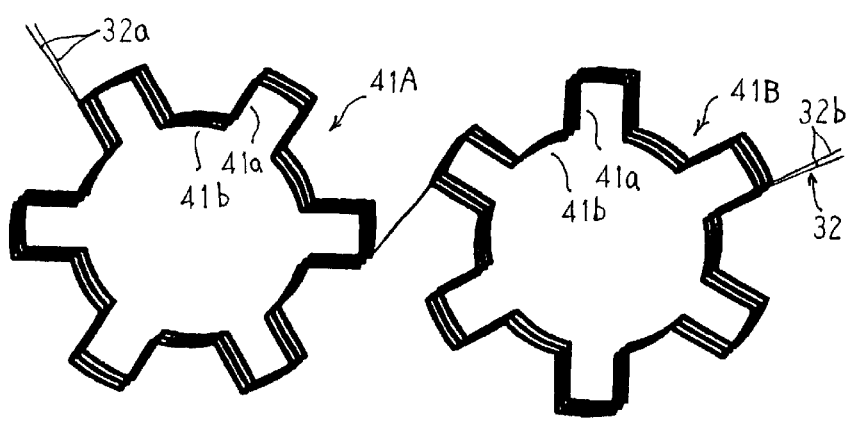
FIG. 13B is another diagram explaining the process for forming the single-phase winding portion constituting the stator winding of the stator in the automotive alternator according to Embodiment 5 of the present invention.
Figure 13C:
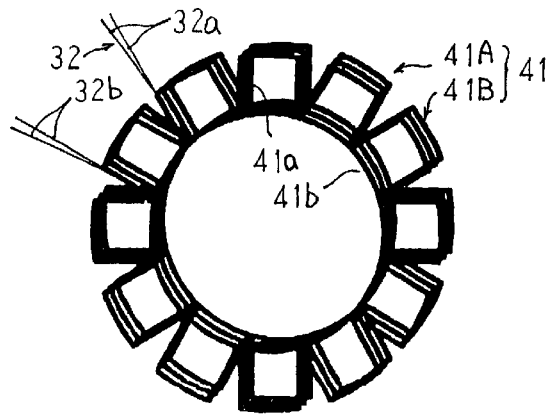
FIG. 13C is yet another diagram explaining the process for forming the single-phase winding portion constituting the stator winding of the stator in the automotive alternator according to Embodiment 5 of the present invention.

First, as shown in FIG. 13A, a first annular winding unit 40a is prepared by simultaneously winding two strands of the conductor wire 32 for a predetermined number of winds, and a second annular winding unit 40b is prepared by continuing to wind the two strands of the conductor wire 32 for a predetermined number of winds. Next, as shown in FIG. 13B, type-A and type-B star winding units 41A and 41B composed of two strands of the conductor wire 32 are prepared by forming the first and second annular winding units 40a and 40b into star shapes in which adjacent pairs of the star-winding slot-housed portions 41a are alternately linked on an inner circumferential side and an outer circumferential side by star-winding crossover portions 41b. Next, as shown in FIG. 13C, the type-A and type-B star winding units 41A and 41B are folded over at a portion of the conductor wires 32 linking the type-A and type-B star winding units 41A and 41B and are stacked on top of each other such that the star-winding slot-housed portions 41a overlap and the star-winding crossover portions 41b face each other radially. The inner circumferential side of the stacked type-A and type-B star winding units 41A and 41B is pushed inside the stator core 15 from a first end surface of the stator core 15, the star-winding crossover portions 41b on the inner circumferential side of the type-A and type-B star winding units 41A and 41B are extended outwards at a second end surface of the stator core 15, and the star-winding slot-housed portions 41a are pushed into each of the slots 15a, installing the single-phase winding portion, which is composed of one divided wave winding 41 prepared from two strands of the conductor wire 32, in the stator core 15.

In Embodiment 5, because the divided wave winding 41 is prepared by simultaneously winding two strands of the conductor wire 32, a single-phase winding portion equivalent to the single-phase winding portion constituted by one divided wave winding 35 according to Embodiment 4 can be constructed by connecting winding start ends 32a and winding finish ends 32b of the divided wave winding 41 so as to connect the two strands of the conductor wire 32 in series. In that case, the number of winding steps for the conductor wire 32 in the process of forming the divided wave winding 41 is half the number of winding steps for the conductor wire 32 in the process of forming the divided wave winding 35, shortening the formation time for a divided wave winding 41 having a predetermined number of turns.

A single-phase winding portion equivalent to the single-phase winding portion constituted by two divided wave windings 35 connected in parallel according to Embodiment 4 can be constructed by connecting the winding start ends 32a and the winding finish ends 32b of the divided wave winding 41 so as to connect the two strands of the conductor wire 32 in parallel. In that case, the number of winding steps for the conductor wire 32 in the process of forming the divided wave winding 41 is the same as the number of winding steps for the conductor wire 32 in the process of forming one divided wave winding 35, but only one divided wave winding is required, effectively shortening the formation time for the divided wave winding.

In Embodiment 5, because the two strands of the conductor wire 32 are wound simultaneously, the winding start ends 32a and the winding finish ends 32b of the two strands of the conductor wire 32 are led out of the same slots, facilitating the connection process.

Embodiment 6

Figure 14:
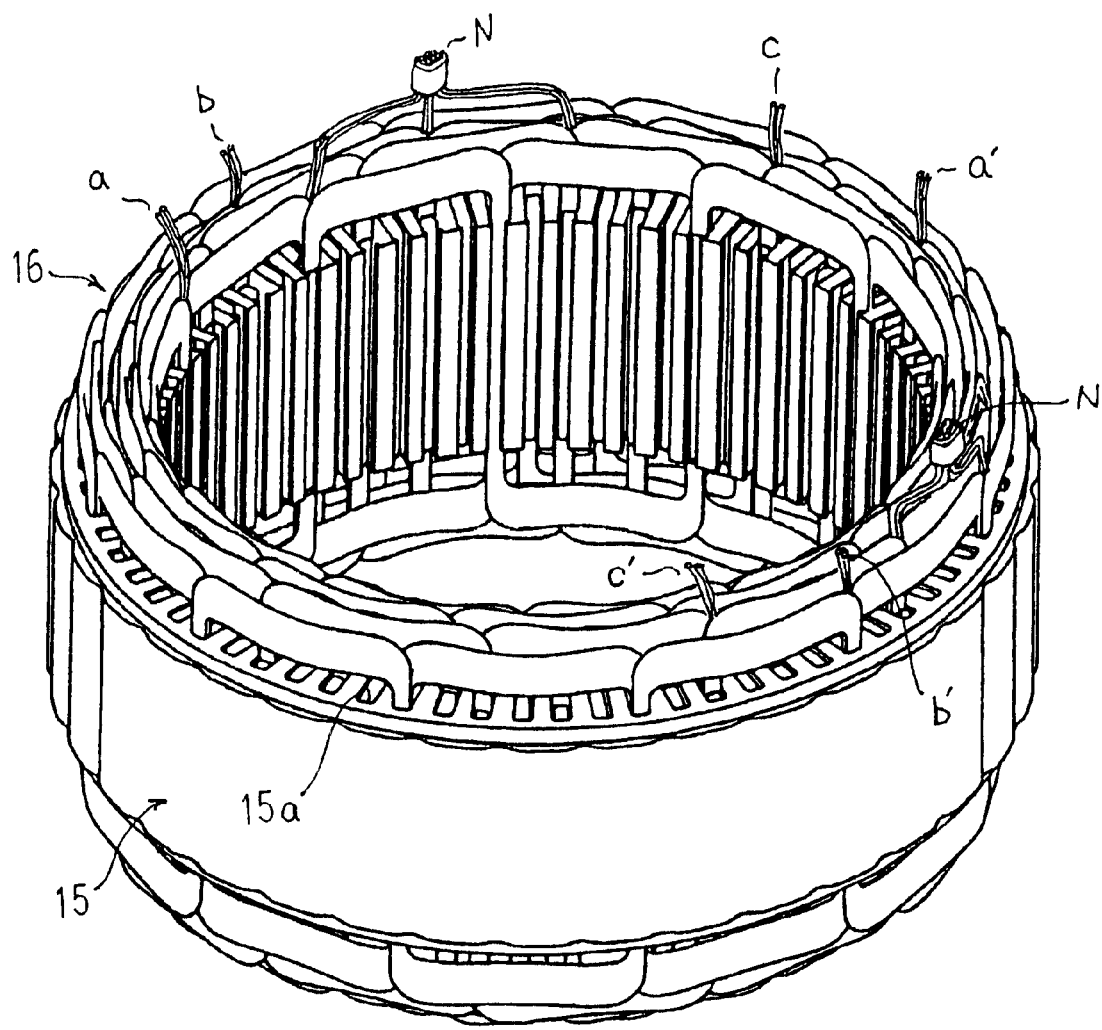
FIG. 14 is a perspective showing a stator in an automotive alternator according to Embodiment 6 of the present invention.

In Embodiment 6, as shown in FIG. 14, the stator winding 16 is constituted by first and second three-phase alternating-current windings 160, constructed such that the slots 15a from which the neutral-point lead wires of the a-phase, b-phase, and c-phase single-phase winding portions constituting the first three-phase alternating-current winding 160 are led out are positioned between the slots 15a from which the b-phase and c-phase output wires are led out, and the slots 15a from which the neutralpoint lead wires of the a'-phase, b'-phase, and c'-phase single-phase winding portions constituting the second three-phase alternating-current winding 160 are led out are positioned between the slots 15a from which the a'-phase and b'-phase output wires are led out. For example, if slot numbers are assigned in a clockwise direction in FIG. 14 with the slot 15a from which the output wire of the a-phase single-phase winding portion is led out as Slot Number 1, then the neutral-point lead wire of the a-phase single-phase winding portion is led out of Slot Number 7, the output wire and neutral-point lead wire of the b-phase single-phase winding portion are led out of Slot Numbers 5 and 11, respectively, and the output wire and neutral-point lead wire of the c-phase single-phase winding portion are led out of Slot Numbers 21 and 15, respectively. The output wire and neutral-point lead wire of the a'-phase single-phase winding portion are led out of Slot Numbers 26 and 32, respectively, the output wire and neutral-point lead wire of the b'-phase single-phase winding portion are led out of Slot Numbers 42 and 36, respectively, and the output wire and neutral-point lead wire of the c'-phase single-phase winding portion are led out of Slot Numbers 46 and 40, respectively. Moreover, the rest of the construction is constructed in a similar manner to Embodiment 1 above.

Consequently, according to Embodiment 6, the neutral-point lead wires are concentrated, facilitating the connection process.

Now, in Embodiment 6 above, the construction is such that the slots 15*a* from which the neutral-point lead wires of the a-phase, b-phase, and c-phase single-phase winding portions are led out are positioned between the slots 15*a* from which the b-phase and c-phase output wires are led out, and the slots 15*a* from which the neutral-point lead wires of the a'-phase, b'-phase, and c'-phase single-phase winding portions are led out are positioned between the slots 15*a* from which the a'-phase and b'-phase output wires are led out, but the construction may be such that the slots 15*a* from which the neutral-point lead wires of the a-phase, b-phase, and c-phase single-phase winding portions are led out are positioned between the slots 15*a* from which the a-phase and b-phase output wires are led out, and the slots 15*a* from which the neutral-point lead wires of the a'-phase, b'-phase, and c'-phase single-phase winding portions are led out are positioned between the slots 15*a* from which the b'-phase and c'-phase output wires are led out.

Embodiment 7

Figure 15:
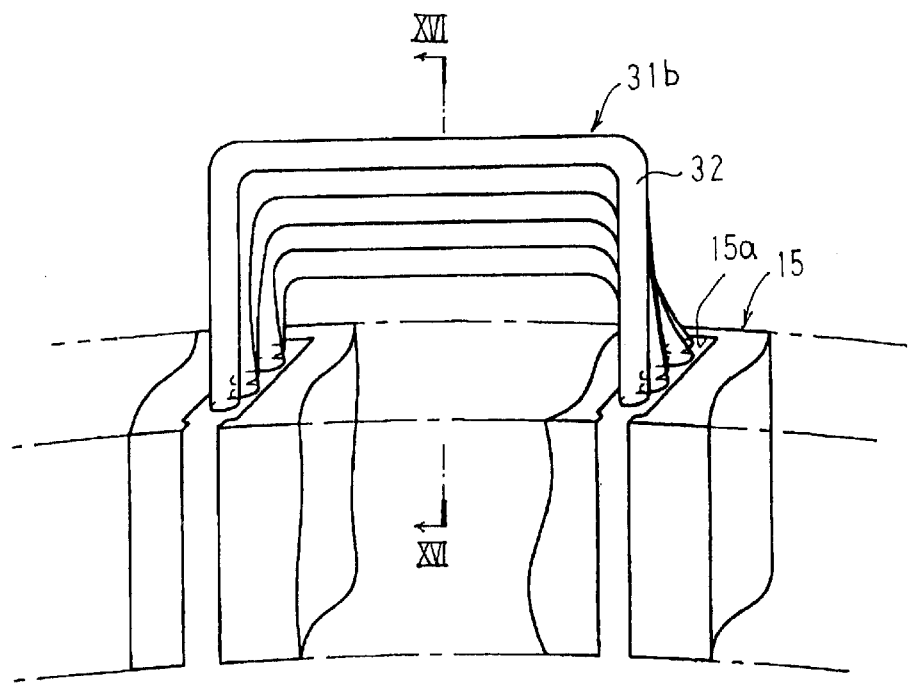
FIG. 15 is a partial perspective explaining a stator winding construction of a stator in an automotive alternator according to Embodiment 7 of the present invention.
Figure 16:
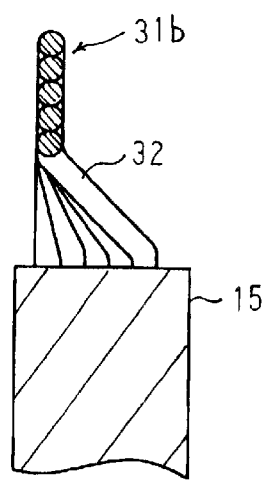
FIG. 16 is a cross section taken along line XVI—XVI in FIG. 15 viewed from the direction of the arrows.

In Embodiment 7, the winds of the conductor wire 32 constituting the wave-winding crossover portions 31*b* positioned in an innermost circumferential layer of the coil end groups 16*f* and 16*r* are arranged so as to line up axially without overlapping radially, as shown in FIGS. 15 and 16. Moreover, the rest of the construction is constructed in a similar manner to Embodiment 1 above.

Consequently, according to Embodiment 7, because the winds of the conductor wire 32 constituting the wave-winding crossover portions 31*b* positioned in the innermost circumferential layer of the coil end groups 16*f* and 16*r* are arranged so as to line up axially without overlapping radially, radial expansion of the coil end groups 16*f* and 16*r* is minimized, and circumferential irregularities in the coil end groups 16*f* and 16*r* are reduced, enabling wind noise to be lowered.

Furthermore, the surface area of the winds of the conductor wire 32 constituting the wave-winding crossover portions 31*b* on the innermost circumferential side exposed to the cooling airflow is increased, effectively suppressing temperature increases in the stator 8.

Moreover, if desired, the winds of the conductor wire 32 constituting the wave-winding crossover portions 3 1*b* positioned in the innermost circumferential layer of one of the coil end groups 16*f* and 16*r* only may be arranged so as to line up axially without overlapping radially.

Embodiment 8

In each of the above embodiments, the single-phase winding portions are constituted by wave windings, but in Embodiment 8, a single-phase winding portion 47 is constituted by a lap winding.

Figure 17:
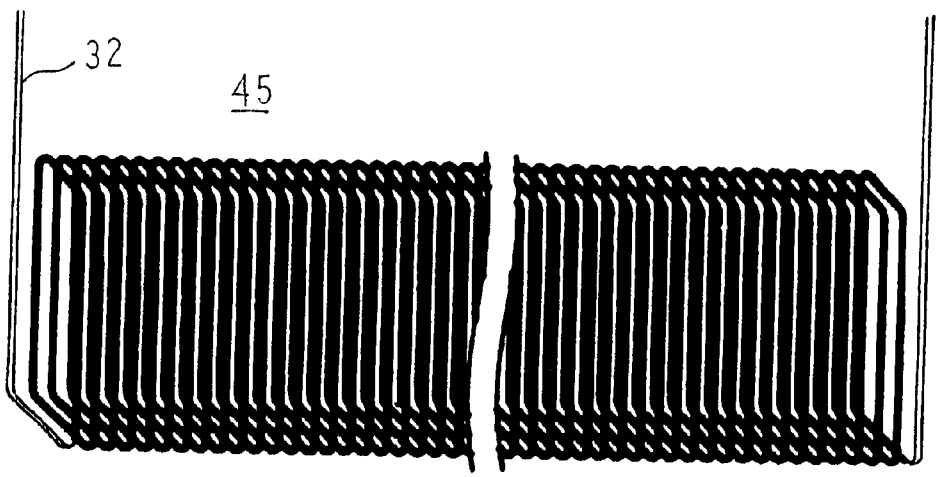
FIG. 17 is a diagram explaining a process for forming a single-phase winding portion constituting a stator winding of a stator in an automotive alternator according to Embodiment 8 of the present invention.
Figure 18:
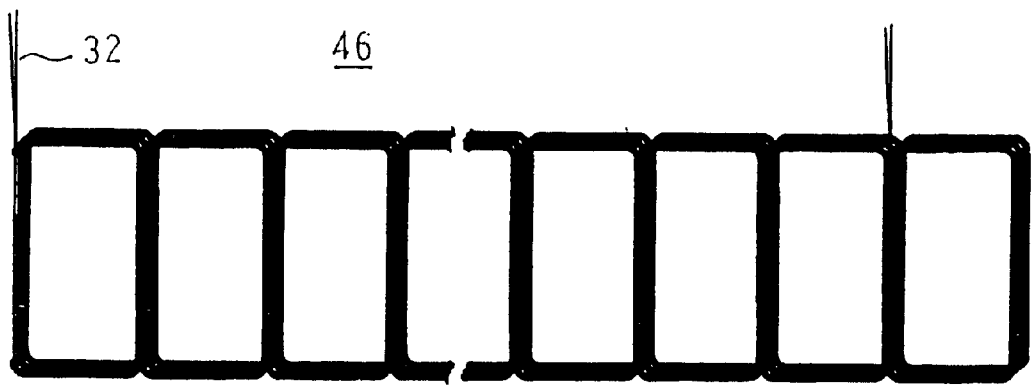
FIG. 18 is another diagram explaining the process for forming the single-phase winding portion constituting the stator winding of the stator in the automotive alternator according to Embodiment 8 of the present invention.
Figure 20:
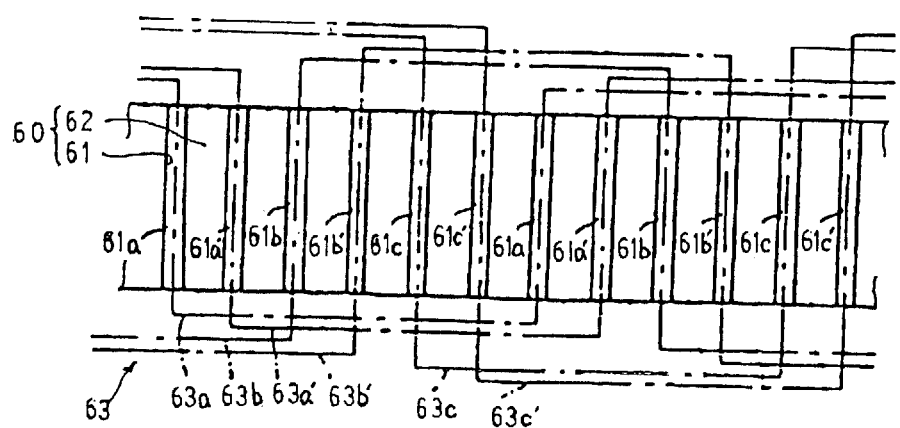
FIG. 20 is a schematic diagram in which a part of a stator in a conventional automotive alternator is developed into a plan.
Figure 21:
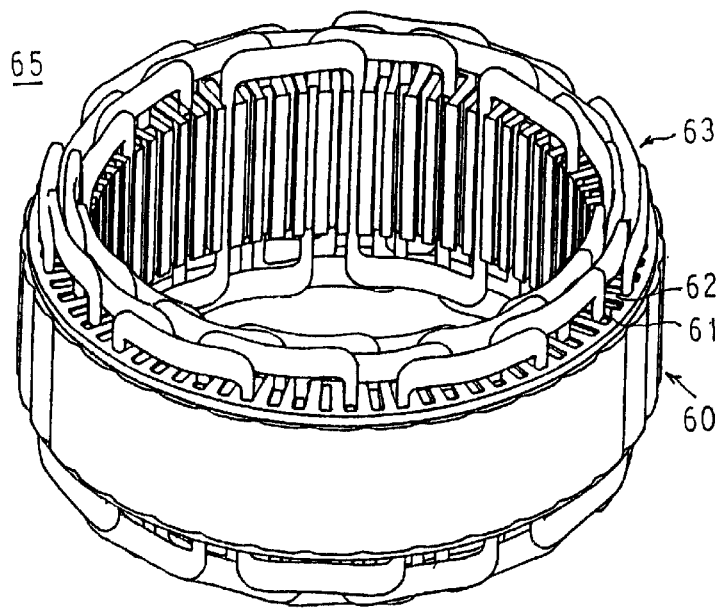
FIG. 21 is a perspective showing the stator in the conventional automotive alternator.
Figure 22:
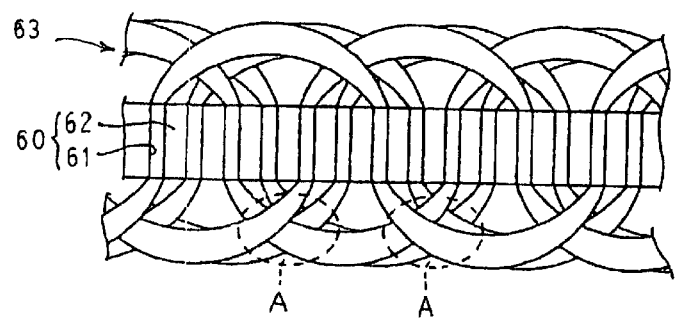
FIG. 22 is another schematic diagram in which a part of the stator in the conventional automotive alternator is developed into a plan.

In Embodiment 8, as shown in FIG. 17, a helical winding unit 45 is prepared by simultaneously winding two strands of the conductor wire 32 into a helical shape. Next, a lap winding unit 46 shown in FIG. 18 is prepared by alternately pressing open the helical winding unit 45 at intervals of a predetermined number of winds in left and right directions in FIG. 17 on a front and rear side of the helical winding unit 45. In addition, the single-phase winding portion 47, shown in FIG. 19, is obtained by installing this lap winding unit 46 into every sixth slot from an inner circumferential side of the stator core 15. This single-phase winding portion 47 is constituted by a divided lap winding in which the conductor wire 32 is wound for a predetermined number of winds into pairs of slots 15*a* six slots apart, and the winds of the conductor wire 32 led out from each of the slots 15*a* are divided into the same number of winds on first and second circumferential sides.

Moreover, the rest of the construction is constructed in a similar manner to Embodiment 1 above.

In Embodiment 8, because the winds of the conductor wire 32 led out from each of the slots 15*a* are also divided into the same number of winds on the first and second circumferential sides in a single-phase winding portion constituted by a lap winding, radial overlap between the bundles of winds of the conductor wire constituting the single-phase winding portions in the regions where the winds of the conductor wire are bent circumferentially after extending outwards from the first and second ends of the slots 15*a* is distributed circumferentially, reducing radial expansion.

Consequently, similar effects to those in Embodiment 1 above can also be achieved in Embodiment 8.

Moreover, in each of the above embodiments, for twelve claw-shaped magnetic poles 22 and 23 in the rotor 7, seventy-two slots 15*a* are disposed in the stator core 15, but the slots 15*a* simply need to be disposed at a ratio of two per phase per pole, and for example, if the number of claw-shaped magnetic poles is sixteen, there will be ninety-six slots 15a.

In each of the above embodiments, the slots 15*a* are disposed at a pitch corresponding to an electrical angle of 60°, but the present invention may also be applied to cases in which the slots 15*a* are arranged so as to alternately adopt electrical angles of $\alpha°$ ($\alpha° \neq 30°$) and $(60-\alpha)°$. In that case, unpleasant harmonic noise can be reduced by setting $\alpha°$ appropriately.

In each of the above embodiments, the winding units are inserted into the slots by radially stacking the slot-housed portions, but the winding units may also be inserted into the slots by circumferentially stacking the slot-housed portions.

Each of the above embodiments has been explained as being applied to a rotor in which a pair of pole cores are fixed to a shaft and a field winding is held by the pole cores, but similar effects can also be achieved if the present invention is applied to a rotor constructed by fixing to a shaft a magnetic-pole-end core on which a plurality of magnetic poles corresponding to the claw-shaped magnetic poles 22 and 23 are spaced and disposed circumferentially, fixing a fixed-end core to a bracket so as to be provided with a predetermined air gap relative to the magnetic-pole-end core, and holding a field winding in the fixed-end core.

In each of the above embodiments, the electrical circuit is constructed such that output from two three-phase alternating-current windings is rectified by individual rectifiers and then combined, but the electrical circuit is not limited to this and may be constructed such that two three-phase alternating-current windings are connected in parallel and output therefrom is rectified by one rectifier, or may be constructed such that two three-phase alternating-current windings are connected in series and output therefrom is rectified by one rectifier. In an electrical circuit constructed in this manner, output decreases slightly, but only one rectifier is required, enabling a cost reduction.

The present invention is constructed in the above manner and exhibits the effects described below.

According to one aspect of the present invention, there is provided an automotive alternator including:

a rotor rotatably supported in a bracket; and a stator provided with a cylindrical stator core in which a plurality of slots extending axially are formed circumferentially and a stator winding installed in the stator core, the stator being supported in the bracket so as to surround an outer circumference of the rotor, wherein the slots are formed in the stator core at a ratio of two per phase per pole, wherein the stator winding is provided with two three-phase alternating-current windings, each of the three-phase alternating-current windings being constructed by forming three single-phase winding portions installed in the slots into an alternating-current connection, and wherein each of the single-phase winding portions is constructed by installing a conductor wire such that winds of the conductor wire extend outwards from first and second ends of the slots, are divided onto first and second circumferential sides, and enter slots on the first and second circumferential sides, whereby radial overlap between bundles of winds of the conductor wire constituting the single-phase winding portion in regions where the winds of the conductor wire are bent circumferentially after being led outwards from the first and second ends of the slots is distributed circumferentially, reducing radial expansion in the corresponding portions. Thus, an automotive alternator is provided in which circumferential irregularities in a coil end group are reduced, enabling wind noise to be lowered, and a heat-dissipating surface area of the coil end group is increased, suppressing temperature increases in the stator, thereby enabling increased performance from the viewpoints of wind noise and output.

At least one of the single-phase winding portions may be provided with a plurality of wave windings formed by winding the conductor wire for a predetermined number of winds into a wave-shaped pattern composed of slot-housed portions disposed at a pitch of six slots in a circumferential direction and crossover portions linking together end portions of adjacent pairs of the slot-housed portions alternately relative to an axial direction, the plurality of wave windings being offset by six slots from each other in a circumferential direction and installed in the slots such that the crossover portions face each other axially, enabling a divided winding to be easily constructed by stacking winding units on top of each other.

At least one of the single-phase winding portions may be provided with a divided wave winding, the divided wave winding including:

a first winding sub-portion formed by winding the conductor wire for a predetermined number of winds into a first wave-shaped pattern composed of first slot-housed portions disposed at a pitch of six slots in a circumferential direction and first crossover portions linking together end portions of adjacent pairs of the first slot-housed portions alternately relative to an axial direction; and a second winding sub-portion formed by continuing to wind the conductor wire from a winding finish end of the first winding sub-portion for a predetermined number of winds into a second wave-shaped pattern composed of second slot-housed portions disposed at a pitch of six slots in a circumferential direction and second crossover portions linking together end portions of adjacent pairs of the second slot-housed portions alternately relative to an axial direction, wherein the first winding sub-portion and the second winding sub-portion are stacked such that the first slot-housed portions and the second slot-housed portions face each other, and the first crossover portions and the second crossover portions face each other axially, enabling the number of neutral-point lead wires and output wires to be reduced, facilitating the connection process.

A neutral-point lead wire of at least one of the single-phase winding portions may be led out of a first slot and an output wire thereof may be led out of a second slot, facilitating the connection process.

At least one of the three-phase alternating-current windings may be constructed by forming the three single-phase winding portions into a Y-connection, slots out of which neutral-point lead wires of the three single-phase winding portions are led being disposed between a circumferentially-adjacent pair of slots out of which output wires of the single-phase winding portions are led, facilitating the connection process.

At least one of the single-phase winding portions may be constructed by installing the conductor wire in a lap winding in the slots, reducing wind noise and suppressing temperature increases in the stator even in a stator formed by installing a stator winding composed of a lap winding into a stator core in which the slots are disposed at a ratio of two per phase per pole.

At least one of the single-phase winding portions may be provided with a winding sub-portion constructed by simultaneously winding a plurality of strands of the conductor wire, enabling neutral point lead wires and output wires to be led out of a common slot, thereby facilitating connection, and reducing the number of winding steps for the conductor wire when forming the winding portions, thereby shortening the formation process time for the winding portions.

At least one of the single-phase winding portions may be constructed by connecting in series winding sub-portions constructed by winding the conductor wire, reducing the diameter of the conductor wire, and suppressing damage to an electrically-insulating coating on the conductor wire resulting from rubbing between the conductor wire and slot opening edge portions during installation of the single-phase winding portions, thereby improving electrical insulation.

The number of divided winds of the conductor wire extending outwards from the first and second ends of the slots and divided onto the first and second circumferential sides may be the same in at least one of the single-phase winding portions, forming coil end groups in a well-balanced manner.

At least one of the single-phase winding portions may be provided with a plurality of winding sub-portions formed by installing at least one strand of the conductor wire in the stator core, the number of divided winds of the conductor wire extending outwards from the first and second ends of the slots and divided onto the first and second circumferential sides being different in each of the plurality of winding sub-portions, and the total number of divided winds of the conductor wire extending outwards from the first and second ends of the slots and divided onto the first and second circumferential sides being the same on the first and second circumferential sides, forming coil end groups in a well-balanced manner even if there is an odd number of turns.

Coil end groups of the stator winding may be constituted by a plurality of crossover portions linking together slot-housed portions of the conductor wire housed in pairs of the slots six slots apart outside end surfaces of the stator core, at least some crossover portions of the plurality of crossover portions being axially offset, enabling a radial dimension of the coil end group to be reduced, thereby ensuring electrical insulation distance between the bracket and the coil end group.

Coil end groups of the stator winding may be constituted by a plurality of crossover portions linking together slot-housed portions of the conductor wire housed in pairs of the slots six slots apart outside end surfaces of the stator core, the crossover portions constituting an inner circumferential side of the coil end groups being constructed such that the winds of the conductor wire therein line up axially without overlapping radially, reducing radial expansion of the coil end group, enabling wind noise resulting from circumferential irregularities in the coil end group to be lowered, and increasing the surface area of the winds of the conductor wire constituting the crossover portions on the innermost circumferential side exposed to the cooling airflow, thereby suppressing temperature increases in the stator.

A fan may be mounted to an axial end surface of the rotor; and
  coil end groups of the stator winding may be constituted by a plurality of crossover portions linking together slot-housed portions of the conductor wire housed in pairs of the slots six slots apart outside end surfaces of the stator core,
  wherein the axial end surface of the rotor to which the fan is mounted is positioned axially outside base portions of the crossover portions, whereby coil end root portions, which are major sources of wind noise, do not overlap with the fan, thereby reducing wind noise.

A fan may be mounted to an axial end surface of the rotor; and
  coil end group of the stator winding may be constituted by a plurality of crossover portions linking together slot-housed portions of the conductor wire housed in pairs of the slots six slots apart outside end surfaces of the stator core,
  wherein the fan and at least one of the crossover portions overlap relative to an axial direction, and
  wherein a ventilation gap is formed between base portions of the crossover portions and end surfaces of the stator, whereby a cooling airflow flows through the ventilation gap, efficiently cooling the coil end group, thereby suppressing temperature increases in the stator.

A central portion of an axial height of the fan and an apex portion of the coil end group may be generally aligned relative to the axial direction, supplying a cooling airflow having the greatest wind speed of any of the cooling airflow discharged from the fan to the apex portion, which has the largest ventilated surface area, efficiently cooling the coil end group, and thereby suppressing temperature increases in the stator.

What is claimed is:

1. An automotive alternator comprising:
   a rotor rotatably supported in a bracket; and
   a stator provided with a cylindrical stator core in which a plurality of slots extending axially are formed circumferentially and a stator winding installed in said stator core, said stator being supported in said bracket so as to surround an outer circumference of said rotor,
   wherein said slots are formed in said stator core at a ratio of two per phase per pole,
   wherein said stator winding is provided with two three-phase alternating-current windings, each of said three-phase alternating-current windings being constructed by forming three single-phase winding portions installed in said slots into an alternating-current connection, and
   wherein each of said single-phase winding portions is constructed by installing a conductor wire such that winds of said conductor wire extend outwards from first and second ends of said slots are divided such that a predetermined number of said winds are directed in each of first and second circumferential directions, and enter slots located a predetermined number of slots away in said first and second circumferential directions, said single-phase winding portions being constructed by installing said conductor wire in a lap winding in said slots.

2. The automotive alternator according to claim 1 wherein each of said three-phase alternating-current windings is constructed by forming said three single-phase winding portions into a Y-connection, slots out of which neutral-point lead wires of said three single-phase winding portions are led being disposed between a circumferentially-adjacent pair of slots out of which output wires of said single-phase winding portions are led.

3. The automotive alternator according to claim 1 wherein in each of said single-phase winding portions, the number of winds of said conductor wire divided in said first circumferential directions after extending outwards from said first and second ends of said slots is different from the number of said winds of said conductor wire divided in said first circumferential directions after extending outwards from said first and second ends of said slots, and the total number of winds of said conductor wire divided in said first and second circumferential directions after extending outwards from said first ends of said slots is the same as the total number of said winds of said conductor wire divided in said first and second circumferential directions after extending outwards from said second ends of said slots.

4. An automotive alternator comprising:
   a rotor rotatably supported in a bracket; and
   a stator provided with a cylindrical stator core in which a plurality of slots extending axially are formed circumferentially and a stator winding installed in said stator core, said stator being supported in said bracket so as to surround an outer circumference of said rotor.
   wherein said slots are formed in said stator core at a ratio of two per phase per pole,
   wherein said stator winding is provided with two three-phase alternating-current windings, each of said three-phase alternating-current windings being constructed by forming three single-phase winding portions installed in said slots into an alternating-current connection, and
   wherein each of said single-phase winding portions is constructed by installing a conductor wire such that winds of said conductor wire extend outwards from first and second ends of said slots, are divided such that a predetermined number of said winds are directed in each of first and second circumferential directions, and enter slots located a predetermined number of slots away in said first and second circumferential directions, wherein each of said single-phase winding portions is provided with a plurality of wave windings formed by winding said conductor wire for a predetermined number of winds into a wave-shaped pattern composed of slot-housed portions disposed at a pitch of six slots in a circumferential direction and crossover portions linking together end portions of adjacent pairs of said slot-housed portions alternately relative to an axial direction, said plurality of wave windings being offset by six slots from each other in a circumferential direction and installed in said slots such that said crossover portions face each other axially, said wave windings being constructed by simultaneously winding a plurality of strands of said conductor wire.

5. The automotive alternator according to claim 4, wherein each of said three-phase alternating-current windings is constructed by forming said three single-phase winding portions into a Y-connection, slots out of which neutral-point lead wires of said three single-phase winding portions are led being disposed between a circumferentially-adjacent pair of slots out of which output wires of said single-phase winding portions are led.

6. The automotive alternator according to claim 4, wherein, in each of said single-phase winding portions, the number of said winds of said conductor wire divided in said first circumferential directions after extending outwards from said first and second ends of said slots is different from the number of said winds of said conductor wire divided in said first circumferential directions after extending outwards from said first and second ends of said slots, and the total number of said winds of said conductor wire divided in said first and second circumferential directions after extending outwards from said first ends of said slots is the same as the total number of said winds of said conductor wire divided in said first and second circumferential directions after extending outwards from said second ends at said slots.

7. A automotive alternator comprising:

a rotor rotatably supported in a bracket; and a stator provided with a cylindrical stator core in which a plurality of slots extending axially are formed circumferentially and a stator winding installed in said stator core, said stator being supported in said bracket so as to surround an outer circumference of said rotor, wherein said slots are formed in said stator core at a ratio of two per phase per pole, wherein said stator winding is provided with two three-phase alternating-current windings, each of said three-phase alternating-current windings being constructed by forming three single-phase winding portions installed in said slots into an alternating-current connection, and wherein each of said single-phase winding portions is constructed by installing a conductor wire such that winds of said conductor wire extend outwards from first and second ends of said slots, are divided such that a predetermined number of said winds are directed in each of first and second circumferential directions, and enter slots located a predetermined number of slots away in said first and second circumferential directions, wherein each of said single-phase winding portions is provided with a divided wave winding, said divided wave winding comprising:

a first winding sub-portion formed by winding said conductor wire for a predetermined number of winds into a first wave-shaped pattern composed of first slot-housed portions disposed at a pitch of six slots in a circumferential direction and first crossover portions linking together end portions of adjacent pairs of said first slot-housed portions alternately relative to an axial direction; and a second winding sub-portion formed by continuing to wind said conductor wire from a winding finish end of said first winding sub-portion for a predetermined number of winds into a second wave-shaped pattern composed of second slot-housed portions disposed at a pitch of six slots in a circumferential direction and second crossover portions linking together end portions of adjacent pairs of said second slot-housed portions alternately relative to an axial direction, wherein said first winding sub-portion and said second winding sub-portion are stacked such that said first slot-housed portions and said second slot-housed portions face each other, and said first crossover portions and said second crossover portions face each other axially, said first and second winding sub-portions being constructed by simultaneously winding a plurality of strands of said conductor wire.

8. The automotive alternator according to claim 7, wherein each of said three-phase alternating-current windings is constructed by forming said three single-phase winding portions into a Y-connection, slots out of which neutral-point lead wires of said three single-phase winding portions are led being disposed between a circumferentially-adjacent pair of slots out of which output wires of said single-phase winding portions are led.

9. The automotive alternator according to claim 7, wherein, in each of said single-phase winding portions, the number of said winds of said conductor wire divided in said first circumferential directions after extending outwards from said first and second ends of said slots is different from the number of said winds of said conductor wire divided in said first circumferential directions after extending outwards from said first and second ends of said slots, and the total number of said winds of said conductor wire divided in said first and second circumferential directions after extending outwards from said first ends of said slots is the same as the total number of said winds of said conductor wire divided in said first and second circumferential directions after extending outwards from said second ends of said slots.

* * * * *